US012655065B2

(12) United States Patent
Slimani et al.

(10) Patent No.: US 12,655,065 B2
(45) Date of Patent: Jun. 16, 2026

(54) COMPOSITE CERAMICS WITH LOW DIELECTRIC LOSSES

(71) Applicant: Imam Abdulrahman Bin Faisal University, Dammam (SA)

(72) Inventors: Yassine Slimani, Dammam (SA); Munirah A. Almessiere, Dammam (SA); Essia Hannachi, Dammam (SA); Abdulhadi Baykal, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 449 days.

(21) Appl. No.: 18/475,843

(22) Filed: Sep. 27, 2023

(65) Prior Publication Data

US 2025/0100937 A1    Mar. 27, 2025

(51) Int. Cl.
*C04B 35/468* (2006.01)
*C04B 35/26* (2006.01)

(52) U.S. Cl.
CPC ...... *C04B 35/4682* (2013.01); *C04B 35/2608* (2013.01); *C04B 2235/3236* (2013.01);
(Continued)

(58) Field of Classification Search
CPC ............ C04B 35/4682; C04B 35/2608; C04B 2235/3236; C04B 2235/3274; C04B 2235/528; C04B 2235/549; C04B 2235/762; C04B 2235/96; C04B 2235/3251; C04B 2235/441; C04B 2235/5436; C04B 2235/5445; C04B 2235/763; C04B 35/2666; C04B 2235/3275; C04B 2235/5454; C04B 2235/765; C04B 2235/80; C01P 2002/60; C01P 2002/85; C01P 2002/54;
(Continued)

(56) References Cited

U.S. PATENT DOCUMENTS 5,755,986 A * 5/1998 Yamamoto ................ H01F 1/37
                                                        148/101
2010/0000769 A1   1/2010  Ohmi et al.

FOREIGN PATENT DOCUMENTS

| CN | 104557027 B | 8/2016 |
| CN | 107417267 B | 1/2020 |
| JP | 2013-155065 A | 8/2013 |

OTHER PUBLICATIONS

Multiferroic BaTiO3—CoFe2Or Nanostrucures, Science, vol. 303, Jan. 30, 2004 (Year: 2004).*

(Continued)

*Primary Examiner* — Elizabeth M Imani
(74) *Attorney, Agent, or Firm* — Oblon, McClelland, Maier & Neustadt, L.L.P.

(57) ABSTRACT

A ceramic composite material includes Barium titanate (BaTiO$_3$) and CoFe$_{1.98}$Nb$_{0.02}$O$_4$. The BaTiO$_3$ is present in an amount of 1 to 99 percent by weight based on the total weight of the BaTiO$_3$ and the CoFe$_{1.98}$Nb$_{0.02}$O$_4$. The CoFe$_{1.98}$Nb$_{0.02}$O$_4$ is present in an amount of 1 to 99 percent by weight based on the total weight of the BaTiO$_3$ and the CoFe$_{1.98}$Nb$_{0.02}$O$_4$. These composite products may be suitable for high-frequency electromagnetic device applications.

20 Claims, 13 Drawing Sheets

(52) U.S. Cl.
CPC    *C04B 2235/3274* (2013.01); *C04B 2235/528*
       (2013.01); *C04B 2235/549* (2013.01); *C04B*
       *2235/762* (2013.01); *C04B 2235/96* (2013.01)

(58) Field of Classification Search
CPC .............. C01P 2004/32; C01P 2004/61; C01P
                2004/62; C01G 23/006; C01G 51/40
See application file for complete search history.

(56)                  References Cited

OTHER PUBLICATIONS

Hu et al . ; Structural evolution and coexistence of ferroelectricity
and antiferromagnetism in Fe, Nb co-doped BaTiO3 ceramics ;
Journal of the European Ceramic Society 43 (2023) ; Jan. 18,
2023 ; 9 Pages.
Venkidu L et al. ; Structure, microstructure, magnetic and
magnetodielectric investigations on BaTi(1-x-y)FexNbyO3 ceram-
ics ; Ceramics International, vol. 44, Issue 7 ; May 2018 ; Abstract
Only ; 2 Pages.
Erdem et al. ; Nanoparticle-Based Magnetoelectric BaTiO3—
CoFe204 Thin Film Heterostructures for Voltage Control of Mag-
netism ; ACS NANO 2016, 10 ; 12 Pages.

* cited by examiner

COMPOSITE CERAMICS WITH LOW DIELECTRIC LOSSES

STATEMENT REGARDING PRIOR DISCLOSURE BY THE INVENTORS

Aspects of the present disclosure are described in Slimani, Y. et. al., "Impact of $CoFe_{1.98}Nb_{0.02}O_4$ phase on the structural, morphological, and dielectric properties of barium titanate material" published in Volume 153, Inorganic Chemistry Communications, which is incorporated herein by reference in its entirety.

STATEMENT OF ACKNOWLEDGEMENT

Access to laboratory facilities at the Institute for Research and Medical Consultations, Imam Abdulrahman Bin Faisal University, Dammam, Saudi Arabia and support provided by the Princess Nourah bint Abdulrahman University Researchers Supporting Project, Princess Nourah bint Abdulrahman University, Riyadh, Saudi Arabia, through project PNURSP2023R11 is gratefully acknowledged.

BACKGROUND

Technical Field

The present disclosure is directed to a $BaTiO_3$ and $CoFe_{1.98}Nb_{0.02}O_4$-based ceramic composite material.

DESCRIPTION OF THE RELATED PRIOR ART

The "background" description provided herein is for the purpose of generally presenting the context of the disclosure. Work of the presently named inventors, to the extent described in this background section, as well as aspects of the description which may not otherwise qualify as prior art at the time of filing, are neither expressly nor impliedly admitted as prior art against the present disclosure.

Magnetoelectric behavior principally indicates that a magnetic field could generate an electric field polarization, and that the resulting electric field could also create magnetization. This behavior arises because of the interactions among the magnetic dipoles and electric dipoles. With the rapid growth of technology, single-phase multiferroic materials cannot fulfill the requirements of certain applications. This is mainly due to their weak magnetoelectric effect and/or the need to operate at low phase temperatures. Interest has turned towards electric and magnetic composite materials to investigate magneto-elastic, electric, and magneto-optical effects. Materials that simultaneously display magnetic and electric characteristics have advantages in certain technological applications for efficient and possible integration in electronic devices.

Smart materials which simultaneously involve electric and magnetic phases have been proposed to enhance the ferric properties of advanced materials. These composite materials display a magnetoelectric effect larger than single-phase materials due to the magnetic-mechanical-electric interactions between the dielectric and magnetic phases. Composite materials composed of dielectric and magnetic phases also showed improvement in other features such as impedance, dielectric properties, and energy storage. Such coupling between electrical and magnetic properties makes it possible to innovate new high-performance devices, including sensors, random access memories, energy harvesters, transformers, antennas, filters, capacitors, thermistors, high-specificity drug delivery, and the like. The composite materials based on dielectric perovskite phases, like lead zirconate titanate $(Pb,Zr)TiO_3$ (PZT) and $BaTiO_3$ (BTO), are widely investigated for these applications. Tangent losses are high in $BaTiO_3$-based composite materials, making them unsuitable for utilization in high-frequency device applications because of low performances. One of the ways to enhance the performance of electronic devices based on the dielectric perovskite phase is investigating the percolation threshold of the dielectric perovskite-metal ferrite composite materials. An enhancement in permittivity has been identified for lower concentrations of conducting ferrites additives.

A variety of compositions have been considered as ferromagnetic-ferroelectric (FM-FE) composites, such as lead zirconate titanate-nickel ferrite-lead zirconate titanate (PZT-NFO—PZT), lead zirconate titanate-nickel ferrite-cobalt ferrite (PZT-NFO—CFO), barium titanate-cobalt ferrite (BTO—CFO), barium titanate-yttrium iron garnet (BTO-YIG), and others. The main reasons behind the attention paid to ceramic composites are their production simplicity, low cost, and the eventual control of both FE and FM phases during the sintering process. Several synthetic approaches have been performed to prepare composite FM-FE materials, such as sol-gel, solid-state reaction, carbon combustion process, mechanical ball-milling, and the like. It is recognized that the most common FM-FE composites consist of cobalt ferrite-lead zirconate titanate (CFO-PZT), since PZT features a high piezoelectric constant exceeding 800 pC/N, [Shrout T R, Zhang S J. Lead-free piezoelectric ceramics: Alternatives for PZT?. Journal of Electroceramics. 2007; 19(1):113] and CFO exhibits a strong magnetostriction constant up to 400 ppm [Mohaideen K K, Joy P A. High magnetostriction parameters for low-temperature sintered cobalt ferrite obtained by two-stage sintering. Journal of magnetism and magnetic materials. 2014; 371:121]. The toxicity of Pb-based materials restricted their use as a ferroelectric component for FM-FE composites. As an alternative, CFO $(CoFe_2O_4)$ and BTO $(BaTiO_3)$ are reliable materials that fulfill the conditions required to obtain effective FM-FE composites, namely strong piezoelectric and piezomagnetic constants, comparable sintering temperature, and chemical stability at high temperature [Martinez-Perez JP, Bolarin-Miró A M, Cortés-Escobedo C A, Sánchez-De Jesús F. Magnetodielectric coupling in barium titanate-cobalt ferrite composites obtained via thermally-assisted high-energy ball milling. Ceramics International. 2022; 48(7):9527].

BTO is a well-known piezoelectric component with reported piezoelectric coefficient values reaching 460 pC/N [Martinez-Pérez JP, Bolarin-Miró A M, Cortés-Escobedo C A, Sánchez-De Jesús F. Magnetodielectric coupling in barium titanate-cobalt ferrite composites obtained via thermally-assisted high-energy ball milling. Ceramics International. 2022; 48(7):9527]. This perovskite material was considered as a lead-free alternative and was widely studied as a ferroelectric component due to its tetragonal (ferroelectric) phase stability at room temperature, easy manufacturing, and multi-purpose applications. In addition to a large magnetostriction coefficient, CFO shows sizable magnetization, strong coercivity, and chemical and physical stability. Furthermore, flexible cation substitution is possible in CFO compound due to its spinel crystalline structure, allowing for the improvement of its magnetic properties. For instance, doping CFO with trivalent $Ga^{3+}$ and $Mn^{3+}$ ions demonstrated the effectiveness of these dopants in increasing the piezomagnetic constant. It was shown that Ga- and Mn-doped cobalt ferrites are suitable for developing new FM-FE composites [Santa-Rosa W, da Silva Jr P S, M'Peko J C, Amorin H, Algueró M, Venet M. Enhanced piezomagnetic coefficient of cobalt ferrite ceramics by Ga and Mn doping for magnetoelectric applications. Journal of Applied Physics. 2019; 125(7):075107]. A change in the magnetic properties of cobalt ferrite was observed after a $Cr^{3+}$ substitution [Li Z, Dai J, Cheng C, Suo Z. Synthesis and magnetic properties of chromium doped cobalt ferrite nanotubes. Materials Research Express. 2020; 7(8):086102]. The $d^0$ configuration of Nb in Nb-doped CFO ferrites prepared by a solid-state reaction route leads to a linear magnetoelectric coefficient at ambient temperature, which is beneficial for magnetoelectric sensors, memory storage devices, and the like. [Patri T. Influence of electric and magnetic poling on properties of Co/Nb codoped cobalt ferrite. Journal of Materials Research and Technology. 2021; 10:1169]. Moreover, Nb doping in the B-sites (Co/Fe) enhanced the efficiency and chemical stability of $Ba_{0.5}Sr_{0.5}Co_{0.5}Feo_{0.2}O_{3-\delta}$ samples under high oxidation conditions [Yusop U A. Effect of Nb and Zn Element Doping on Barium Strontium Cobalt Ferrite-Based Cathode for Solid Oxide Fuel Cell-A Short Review. Malaysian Journal of Microscopy. 2022; 18(1): 226]. $Nb^{3+}$ ion substitution on the magnetic features of $CoFe_2O_4$ nanoparticles revealed stable physical properties.

Although FM-FE composites have been developed, there still exists a need to develop composite materials which can overcome the limitations of the art. Accordingly, an object of the present disclosure is to develop $BaTiO_3$ and $CoFe_{1.98}Nb_{0.02}O_4$-based ceramic composite materials. The ceramic composite materials exhibit beneficial properties not otherwise available from solely lead-free $BaTiO_3$ and niobium substituted $CoFe_2O_4$, thereby overcoming the drawbacks of the art.

SUMMARY

In an exemplary embodiment, a ceramic composite material is described. The ceramic composite material includes Barium titanate (BTO) ($BaTiO_3$) and $CoFe_{1.98}Nb_{0.02}O_4$, wherein the $BaTiO_3$ is present in an amount of 1 to 99 percent (%) by weight based on a total weight of the BTO and the $CoFe_{1.98}Nb_{0.02}O_4$, wherein the $CoFe_{1.98}Nb_{0.02}O_4$ is present in an amount of 1 to 99% by weight based on the total weight of the BTO and the $CoFe_{1.98}Nb_{0.02}O_4$.

In some embodiments, particles in a BTO phase have a crystallite size of 20 to 45 nm.

In some embodiments, the BTO phase is present as a single phase with a tetragonal structure.

In some embodiments, particles in a $CoFe_{1.98}Nb_{0.02}O_4$ phase have a crystallite size of 5 to 50 nm.

In some embodiments, the $CoFe_{1.98}Nb_{0.02}O_4$ phase is present as a single phase.

In some embodiments, the BTO and the $CoFe_{1.98}Nb_{0.02}O_4$ are present as separate phases.

In some embodiments, the BTO is a cubic phase.

In some embodiments, the ceramic composite material has a porous, irregular granular morphology with an average particle size of 0.1 to 10 μm.

In some embodiments, the BTO phase comprises spherical particles with an average particle diameter of 0.1 to 2 μm.

In some embodiments, the $CoFe_{1.98}Nb_{0.02}O_4$ phase comprises rhombic particles with an average particle diameter of 0.5 to 5 μm.

In some embodiments, the ceramic composite material has one or more regions of a BTO phase and one or more regions of a $CoFe_{1.98}Nb_{0.02}O_4$ phase.

In some embodiments, the ceramic composite material is biphasic, including a dielectric BTO phase and a magnetic $CoFe_{1.98}Nb_{0.02}O_4$ phase.

In some embodiments, barium is present in an amount of 10 to 30 mol percent, titanium is present in an amount of 10 to 30 mol percent, oxygen is present in an amount of 40 to 60 mol percent, cobalt is present in an amount of 0.1 to 3 mol percent, iron is present in an amount of 0.1 to 4 mol percent, and niobium is present in an amount of 0.1 to 2 mol percent based on a total number of mols of the barium, titanium, oxygen, cobalt, iron, and niobium.

In some embodiments, the ceramic composite material has a dielectric constant of 1 to 20 at a frequency of 1 to $10^6$ Hz.

In some embodiments, the ceramic composite material has a dielectric loss of 0.1 to 7 at a frequency of 1 to $10^6$ Hz, according to ASTM D150.

In some embodiments, the ceramic composite material has a dielectric loss tangent of 0.01 to 1 at a frequency of 1 to $10^6$ Hz.

In some embodiments, the BTO is made by a sol-gel process.

In some embodiments, the $CoFe_{1.98}Nb_{0.02}O_4$ is made by a hydrothermal process.

In some embodiments, the ceramic composite material is made by a solid-state reaction process.

In some embodiments, a high-frequency device, including the material including BTO and $CoFe_{1.98}Nb_{0.02}O_4$.

These and other aspects of non-limiting embodiments of the present disclosure will become apparent to those skilled in the art upon review of the following description of specific non-limiting embodiments of the disclosure in conjunction with the accompanying drawings.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of embodiments of the present disclosure (including alternatives and/or variations thereof) and many of the attendant advantages thereof will be readily obtained as the same becomes better understood by reference to the following detailed description of the embodiments when considered in connection with the following drawings, in which.

DETAILED DESCRIPTION

Figure 1:
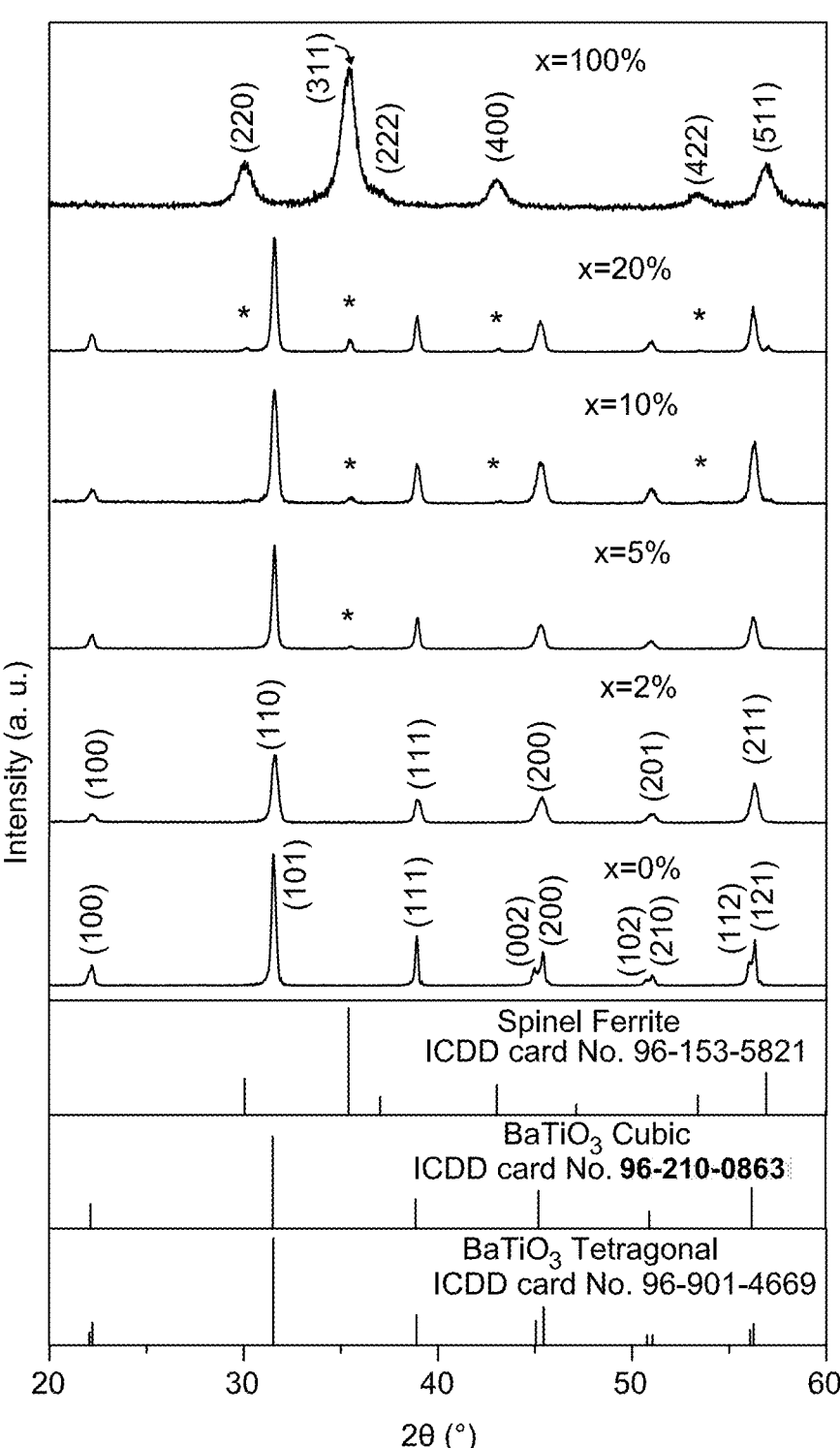
FIG. 1 shows X-ray diffraction (XRD) patterns of (100-x) % $BaTiO_3$ (BTO)+x % $CoFe_{1.98}Nb_{0.02}O_4$ composites (x=0%, 2%, 5%, 10%, 20%, and 100%) and reference cards of different phases, according to certain embodiments.

In the following description, it is understood that other embodiments may be utilized, and structural and operational changes may be made without departure from the scope of the present embodiments disclosed herein.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

As used herein, "particle size" may be thought of as the length or longest dimension of a particle.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, "composite material" or "composites" refers to a combination of two or more constituent materials with distinct physical and chemical properties. The constituent materials may have notably dissimilar chemical or physical properties that, when merged, produce the composite material with properties unlike the individual materials. Within the composite material, the constituent materials remain separate and distinct, which distinguish composites from mixtures and solid solutions.

As used herein, "nanoparticles" are particles having a particle size of 1 to 500 nm within the scope of the present disclosure. The nanoparticles may exist in various nanomaterial shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, the like, and mixtures thereof.

As used herein, a "ceramic" refers to an inorganic non-metallic solid constructed of either metal or non-metal compounds, such as metallic oxide, inorganic, nitride, and/or carbide material, which have been shaped and then hardened via heating at high temperatures. Ceramics are hard, brittle, strong in compression, and weak in shearing and tension. Ceramics can withstand high temperatures and chemical corrosion caused by acidic and caustic environments and the like.

As used herein, "magnetic materials" refers to materials that produce a magnetic field in response to an applied magnetic field (also referred to as "magnetism") or get impacted by external electromagnetic fields in their surroundings. The overall magnetic behavior of magnetic materials may vary depending on structure of the material, the electronic configuration, and the like. Types of magnetic material may include ferromagnetic materials, ferrimagnetic materials, paramagnetic materials, diamagnetic materials, and the like.

As used herein, "ferromagnetic materials" refers to materials that demonstrate a spontaneous net magnetization at an atomic level despite the absence of an external magnetic field, and the materials acquire permanent magnetism. Ferromagnetic materials may have unpaired electrons. Intrinsic magnetic moments of the unpaired electrons in the ferromagnetic material have tendency to be parallelly aligned in an applied magnetic field as well as a magnetic moment tendency to orientate parallel to one another in the absence of an applied magnetic field to maintain a lowered energy state. Ferromagnetic materials may have a crystalline structure and/or a microstructure to achieve ferromagnetism.

As used herein, "ferroelectric property" refers to a property of some materials for having a spontaneous polarization that can be reversed by the function of an external electric field. Materials with ferromagnetic and ferroelectric properties are multiferroic.

As used herein, "paraelectric property" refers to the capability of certain materials (specifically ceramic crystals) to become polarized under an applied electric field. Materials with paraelectric properties may have no dipoles without the presence of an electric field. Materials with paraelectric properties may form dipoles and show polarization when an electric field is applied, which may disappear when the electric field is removed.

As used herein, "dipole" refers to a pair (2) of equal and oppositely charged or magnetized poles separated by a distance.

As used herein, "piezoelectricity" refers to electric polarization that is resultant of mechanical stress, such as pressure and latent heat. Piezoelectricity is the electric charge that accumulates in solid materials, such as crystals, ceramics, and the like, in response to applied mechanical stress.

As used herein, a "dielectric constant", also referred to as "relative permittivity" or "permittivity", refers to a measure of a substance for storing electrical energy in an electric field. It is the ratio of the permittivity of a material or substance to the permittivity of free space or a vacuum.

As used herein, "sol-gel process" refers to method for producing solid materials from small molecules. The chemical synthesis method for producing materials, including resins, where an oxide network is developed through at least polycondensation reactions of a molecular precursor in a liquid. In the present case, the molecular precursors are the silane derivatives (alkoxysilanes). The sol-gel process is a wet-chemical technique that may be used for the fabrication of glassy and ceramic materials, and the like. In the chemical procedure, a "sol" (colloidal solution") is formed and gradually transitions towards the formation of a gel-like diphasic system, which contains and liquid and a solid phase. These phases comprise morphologies ranging from discrete particles to continuous polymer networks and the like. Removal of the remaining liquid or solvent phase may require a drying process, which may result in the shrinkage and densification of the material. A thermal treatment may be used for further polycondensation. The properties of a sol-gel material may be influenced by variation in the drying process and thermal treatment. The finished product of a sol-gel synthesis process can be referred to as a "sol-gel material", a "sol-gel processed material", a "sol-gel product," or a "sol-gel processed product".

As used herein, a "hydrothermal process" refers to a process in which a nanomaterial synthesis is dependent on the solubility of the reaction species in a water medium at a desired pressure. The hydrothermal process may include various techniques of crystallizing substances from high-temperature aqueous solutions at high vapor pressures. The hydrothermal process may also be referred to as a "hydrothermal synthesis" or "hydrothermal method".

As used herein, "crystallites" refers to small (generally microscopic) crystals that are bonded together by boundaries that are substantially irregular, including polycrystalline solids. Crystallites may form during the cooling of materials.

Aspects of the present disclosure are directed to composite materials of $BaTiO_3$ (BTO) and $CoFe_{1.98}Nb_{0.02}O_4$. Magnetic $CoFe_{1.98}Nb_{0.02}O_4$ and dielectric BTO phases were initially prepared via sol-gel and hydrothermal methods, respectively. Next, diverse materials of (100-x) % BTO+x % $CoFe_{1.98}Nb_{0.02}O_4$ (x=0, 2, 5, 10, 20, and 100%) were developed using a solid-state reaction. The development of biphasic materials is confirmed through X-ray diffraction (XRD) and energy dispersive X-rays (EDX) analyses. Scanning electron microscope (SEM) observations indicated the existence of dissimilar particles in terms of shape and size, which belong to $CoFe_{1.98}Nb_{0.02}O_4$ and BTO phases. The variations in dielectric constants and loss tangents were also investigated at ambient temperature in a frequency range of $10^0$ to $10^6$ Hz. Low values of dielectric loss tangent less than 1 are observed for different composites (i.e., x=2, 5, 10, and 20%). More specifically, composite materials with x≥5% displayed very low dielectric loss tangent (below 0.1), along with good stability over the entire frequency range. The obtained results indicated that these composite products could be suitable for high-frequency electromagnetic device applications.

Embodiments of the present disclosure relate to ceramic composite materials that include $BaTiO_3$ (BTO) and $CoFe_{1.98}Nb_{0.02}O_4$. BTO belongs to the family of perovskites oxides $(ABO_3)$, and it is a compound with ferroelectric properties and a high dielectric constant. It is a ferroelectric prototype that goes through a sequential crystal structure shift with temperature from ferroelectric to the paraelectric phase. The dielectric, ferroelectric, and piezoelectric properties of BTO as a multifunctional perovskite ceramic material have applications in diverse fields, such as thermostats, thermistors, multilayer ceramic capacitors, sensors, energy storage devices, energy conversion technologies, catalysis, biomedical applications, and the like.

In an embodiment, the BTO is present in an amount of 1-99%, preferably 5-98, preferably 10-95, preferably 15-90, preferably 20-85, preferably 25-80, preferably 30-75, preferably 35-70, preferably 40-65, preferably 45-60% by weight based on the total weight of the BTO and the $CoFe_{1.98}Nb_{0.02}O_4$. In a specific embodiment, BTO is present in an amount of about 98% by weight. In another embodiment, BTO is present in an amount of about 95% by weight. In another embodiment, BTO is present in an amount of about 90% by weight. In yet another embodiment, BTO is present in an amount of about 80% by weight.

In some embodiments, particles in a BTO phase have a crystallite size of 20-45 nm, preferably 21-44, preferably 22-43, preferably 23-42, preferably 24-41, preferably 25-40, preferably 26-39, preferably 27-38, preferably 28-37, and preferably 29-36 nm. In a preferred embodiment, the crystallite size of pure BTO is about 36.8 nm. In some embodiments, the $BaTiO_3$ phase includes spherical particles with an average particle diameter of 0.1-2 μm, preferably 0.2-1.9, preferably 0.3-1.8, preferably 0.4-1.7, preferably 0.5-1.6, preferably 0.6-1.5, preferably 0.7-1.4, preferably 0.8-1.3, preferably 0.9-1.2, and preferably 1.0-1.1 μm. In some embodiments, the BTO phase is present as a single phase with a tetragonal structure, indicating the creation of single-phase ferroelectric $BaTiO_3$ perovskite. In some embodiments, the BTO phase in the ceramic material includes spherical particles with a high density of pores. In some embodiments, the BTO phase in the ceramic material includes spherical particles with a tetragonal structure. In some other embodiments, the BTO phase in the ceramic material includes spherical particles with a cubic phase. Numerous methods, such as co-precipitation, hydrothermal, sol-gel methods, are known in the art of preparing the BTO. In a preferred embodiment, BTO is made by a sol-gel process.

The composite also contains $CoFe_{1.98}Nb_{0.02}O_4$, which is a Nb-based cobalt ferrite. The $d^o$ configuration of Nb leads to a linear magnetoelectric coefficient at ambient temperature, which may be used for magnetoelectric sensors, memory storage devices, and the like. The $CoFe_{1.98}Nb_{0.02}O_4$ is present in an amount of 1-99%, preferably 2-95, preferably 5-90, preferably 10-85, preferably 15-80, preferably 20-75, preferably 25-70, preferably 30-65, preferably 35-60, preferably 40-55% by weight based on the total weight of the BTO and the $CoFe_{1.98}Nb_{0.02}O_4$. In a specific embodiment, $CoFe_{1.98}Nb_{0.02}O_4$ is present in an amount of about 2% by weight based. In another embodiment, $CoFe_{1.98}Nb_{0.02}O_4$ is present in an amount of about 5% by weight. In another embodiment, $CoFe_{1.98}Nb_{0.02}O_4$ is present in an amount of about 10% by weight. In yet another embodiment, $CoFe_{1.98}Nb_{0.02}O_4$ is present in an amount of about 20% by weight.

In some embodiments, particles in a $CoFe_{1.98}Nb_{0.02}O_4$ phase have a crystallite size of 5-50 nm, preferably 6-49, preferably 7-48, preferably 8-47, preferably 8-46, preferably 10-45, preferably 11-44, preferably 12-43, preferably 13-42, preferably 14-41, preferably 15-40, preferably 16-39, preferably 17-38, preferably 18-37, preferably 19-36, preferably 20-35, preferably 21-34, preferably 22-33, preferably 23-32, and preferably 24-31 nm. In a preferred embodiment, the crystallite size of $CoNb_{0.02}Fe_{1.98}O_4$ is about 10.6 nm. In some embodiments, the $CoFe_{1.98}Nb_{0.02}O_4$ phase is present as a single phase with a cubic spinel structure. In some embodiments, the $CoFe_{1.98}Nb_{0.02}O_4$ phase includes rhombic particles with an average particle diameter of 0.5-5 μm, preferably 0.5-4.5, preferably 1-4, preferably 1.5-3.5, preferably about 2-3 μm. In some embodiments, the $CoFe_{1.98}Nb_{0.02}O_4$ is made by a hydrothermal process.

In some embodiments, the ceramic composite material is made by a solid-state reaction process. In some embodiments, the BTO and the $CoFe_{1.98}Nb_{0.02}O_4$ are present as separate phases in the ceramic composite material. In an embodiment, the $CoFe_{1.98}Nb_{0.02}O_4$ phase is present as a cubic spinel structure in the ceramic composite material. In an embodiment, the BTO is a cubic phase ceramic composite material. In certain other embodiments, the BTO is in a tetragonal phase ceramic composite material. In a certain embodiment, the BTO in the ceramic composite material may exist in both the tetragonal and cubic phases, with the cubic phase being the predominant phase. In some embodiments, more than 50%, preferably 60%, preferably 70%, preferably 80%, preferably 85%, preferably 90%, preferably 95%, preferably 96%, preferably 97%, preferably 98%, and preferably 99% of BTO exists in the cubic phase in the ceramic composite material.

In some embodiments, the ceramic composite material has a porous, irregular granular morphology with an average particle size of 0.1-10 μm, preferably 0.5-9.5, preferably 1-9, preferably 1.5-8.5, preferably 2-8, preferably 2.5-7.5, preferably 3-7, preferably 3.5-6.5, preferably 4-6, and preferably 4.5-5.5 μm. In some embodiments, the ceramic composite material has one or more regions of a $BaTiO_3$ phase and one or more regions of a $CoFe_{1.98}Nb_{0.02}O_4$ phase. In some embodiments, the one or more regions of the $BaTiO_3$ phase are in the shape of granules with a particle size of 0.1-1 μm and the one or more regions of the $CoFe_{1.98}Nb_{0.02}O_4$ phase are in the shape of polygons such as cubes and/or rhombohedrons, e.g., rhombuses with a particle size of 1-4 μm. In some embodiments, the $CoFe_{1.98}Nb_{0.02}O_4$ phase is in the shape of rhombohedrons with a particle size of 1-4 μm. In some embodiments, the one or more regions of the $CoFe_{1.98}Nb_{0.02}O_4$ phase may be clustered together in a group of 2-25 rhombuses, preferably 5-20 rhombuses, preferably 10-15 rhombuses. In some embodiments, the one or more regions of the $CoFe_{1.98}Nb_{0.02}O_4$ phase may be a single rhombus. In some embodiments the one or more regions of the $BaTiO_3$ phase may be in a layer of the granules with the one or more regions of the $CoFe_{1.98}Nb_{0.02}O_4$ phase protruding from the $BaTiO_3$ phase layer. In some embodiments, the $CoFe_{1.98}Nb_{0.02}O_4$ phase may form together due to the ferromagnetic properties of the material. In some embodiments, the ceramic composite material is biphasic, including a dielectric $BaTiO_3$ phase and a magnetic $CoFe_{1.98}Nb_{0.02}O_4$ phase.

In some embodiments, the ceramic composite includes barium (Ba) in an amount of 10-30 mol %, preferably 11-29, preferably 12-28, preferably 13-27, preferably 14-26, preferably 15-25, preferably 16-24, preferably 17-23, preferably 18-22, preferably 19-21 mol %; titanium (Ti) is present in an amount of 10-30 mol % percent, preferably 11-29, preferably 12-28, preferably 13-27, preferably 14-26, preferably 15-25, preferably 16-24, preferably 17-23, preferably 18-22, preferably 19-21 mol %; oxygen (O) is present in an amount of 40-60 mol %, preferably 41-59, preferably 42-58, preferably 43-57, preferably 44-56, preferably 45-55, preferably 46-54, preferably 47-53, preferably 48-52, preferably 49-51 mol %; cobalt (Co) is present in an amount of 0.1-3 mol %, preferably 0.2-2.9, preferably 0.3-2.8, preferably 0.4-2.7, preferably 0.5-2.6, preferably 0.6-2.5, preferably 0.7-2.4, preferably 0.8-2.3, preferably 1.0-2.2, preferably 1.1-2.1, preferably 1.2-2, preferably 1.3-1.9, preferably 1.4-1.8, and preferably 1.5-1.7 mol %; iron (Fe) is present in an amount of 0.1-4 mol %, preferably 0.2-3.9, preferably 0.3-3.8, preferably 0.4-3.7, preferably 0.5-3.6, preferably 0.6-3.5, preferably 0.7-3.4, preferably 0.8-3.3, preferably 1.0-3.2, preferably 1.1-3.1, preferably 1.2-3, preferably 1.3-2.9, preferably 1.4-2.8, preferably 1.5-2.7, preferably 1.6-2.6, preferably 1.7-2.5, preferably 1.8-2.4, preferably 1.9-2.3, preferably 2.0-2.2 mol %; and niobium (Nb) is present in an amount of 0.1-2 mol %, preferably 0.2-1.9, preferably 0.3-1.8, preferably 0.4-1.7, preferably 0.5-1.6, preferably 0.6-1.5, preferably 0.7-1.4, 0.8-1.5, preferably 0.9-1.4, preferably 1.0-1.3, preferably 1.1-1.2 mol % based on a total number of mols of the Ba, Ti, O, Co, Fe, and Nb.

In some embodiments, the ceramic composite has a dielectric constant of 1-20, preferably 2-19, preferably 3-18, preferably 4-17, preferably 5-16, preferably 6-15, preferably 7-14, preferably 8-13, preferably 9-12, preferably 10-11 at a frequency of $1-10^6$ Hz.

In some embodiments, a dielectric loss of 0.1-7, preferably 0.5-6.5, preferably 1.0-6.0, preferably 1.5-5.5, preferably 2-5, preferably 2.5-4.5, preferably 3-4 at a frequency of $1-10^6$, according to ASTM D150.

In some embodiments, the ceramic composite material has a dielectric loss tangent of 0.01-1, preferably 0.05-0.95, preferably 0.1.0-0.90, preferably 0.15-0.85, preferably 0.2-0.8, preferably 0.25-0.75, preferably 0.3-0.7, preferably 0.35-0.65, preferably 0.4-0.6, preferably 0.45-0.55, and preferably 0.4-0.5 at a frequency of $1-10^6$, according to ASTM D150.

The ceramic composite material of the present disclosure may be used to manufacture antennas, radio frequency transmission components, microwave transmission components, high energy density capacitors, high-voltage insulators, and other applications that may benefit from a composite material with a high dielectric constant. In some embodiments, the ceramic composite material can be used in a high frequency device.

EXAMPLES

The following examples demonstrate a ceramic composite material as described herein. The examples are provided solely for illustration and are not to be construed as limitations of the present disclosure, as many variations thereof are possible without departing from the spirit and scope of the present disclosure.

Process of Preparing $CoNb_{0.02}Fe_{1.98}O_4$ Nanoparticles

Spinel ferrite $CoNb_{0.02}Fe_{1.98}O_4$ nanoparticles were prepared using the hydrothermal method. Stoichiometric quantities of commercially available cobalt(II) nitrate ($Co(NO_3)_2$) and iron (III) nitrate hexahydrate ($Fe(NO_3)_3 \cdot 6H_2O$) were dissolved in about 60 mL of deionized water under continuous stirring. At the same time, niobium(V) chloride ($NbCl_5$) was dissolved in concentrated hydrochloric acid under continuous stirring. The two separate solutions were combined and remained under uninterrupted stirring. Then, sodium hydroxide was added to the mixed solution to adjust the pH to 11. After a while, the solution was placed inside a stainless-steel Teflon autoclave and put in an oven at 180° C. for 10 hours. The obtained solution was washed and dried to get powder of $CoNb_{0.02}Fe_{1.98}O_4$ nanoparticles.

Dielectric Phase

Sol-gel auto-combustion method was employed to produce the $BaTiO_3$ (BTO) phase by utilizing titanium(IV) isopropoxide $Ti[OCH(CH_3)_2]_4$ and barium acetate $(Ba(CH_3COO)_2$ as raw materials, which were purchased from Sigma Aldrich. Appropriate amounts of $Ti[OCH(CH_3)_2]_4$ and $Ba(CH_3COO)_2$ were dissolved under continuous stirring and heating (~80° C.) in separate beakers, each containing an ethanolic solution. The two solutions were mixed together under uninterrupted stirring and heating. Later, citric acid ($C_6H_8O_7$) was added to act as a fuel, and the temperature was slightly increased to 120° C. A milky solution was formed after a while, which later transformed to a gel and then self-propagating combusted. The obtained powder was collected, ground in the agate mortar, and finally, calcined at about 1100° C. for 5 hours to obtain the final BTO sample.

Composites

Diverse (100-x) % BTO+x % $CoFe_{1.98}Nb_{0.02}O_4$ composite materials with x=0, 2, 5, 10, 20, and 100% were made by utilizing the above-mentioned ferroelectric and ferrite phases using a solid-state reaction route. Polyvinyl alcohol, acting as a binder, was added to the mixed composite powders. The powders were pressed into disk-shaped (diameter ~13 mm) samples using a hydraulic press. The pellets were then sintered at 1200° C. for 4 hours.

Characterizations

The crystal structure and the phase identification of the prepared composites were determined through X-ray diffraction (XRD) patterns by a Rigaku Benchtop Miniflex diffractometer with $CuK_a$ radiation (manufactured by Rigaku Corporation, 3 Chome-9-12 Matsubaracho, Akishima, Tokyo 196-8666, Japan). Rietveld refinement was carried out using the Match 3 program to determine the structural parameters. The morphological and elemental analyses were performed using a field emission scanning electron microscope (SEM; FEI Quanta). Dielectric measurements were analyzed using Novocontrol Technologies (high-resolution Alpha-A frequency analyzer).

XRD patterns of (100-x) % BTO+x % $CoFe_{1.98}Nb_{0.02}O_4$ composites (x=0%, 2%, 5% 10%, 20%, and 100%) are depicted in FIG. 1. XRD patterns have been analyzed by Match 3 software. The patterns of x=0% and x=100% compositions displayed well-defined peaks, revealing the creation of single-phase ferroelectric $BaTiO_3$ perovskite with tetragonal structure (ICDD card no. 96-901-4669) and single-phase $CoFe_{1.98}Nb_{0.02}O_4$ ferrite with cubic spinel structure (ICDD card no. 96-153-5821), respectively. The tetragonal structure observed for pure BTO was confirmed by the splitting (002)/(200) at 2θ ~45°. For both cases, the XRD patterns did not show any traces of impurity phases, indicating the high purity of the synthesized BTO and $CoNb_{0.02}Fe_{1.98}O_4$ samples.

The analysis of different composites (x=2%, 5%, 10%, and 20%) showed that the perovskite and ferrite exist distinctly in the composites. It supported that the BTO phase formed a perovskite structure (space group, P4 mm), while the $CoNb_{0.02}Fe_{1.98}O_4$ ferrite phase formed a spinel structure. The splitting (002)/(200) observed for pure BTO was merged into a single peak (100-x) % BTO+x % $CoFe_{1.98}Nb_{0.02}O_4$ composites. This indicated that a transformation from tetragonal to cubic phase occurred when the $CoNb_{0.02}Fe_{1.98}O_4$ was added to the BTO. Moreover, the absence of any other distinct peak indicated that an intermediate phase is not formed at the interfaces between the constituent phases during the sintering process. It was also observed that the ferrite phase is not detected for low concentrations of $CoNb_{0.02}Fe_{1.98}O_4$. The peak intensity of the ferrite phase increased with the rise in $CoNb_{0.02}Fe_{1.98}O_4$ content. Analysis of $CoFe_2O_4$-BTO showed no trace of ferrite phase until an 8% of $CoFe_2O_4$ content was reached. This effect may be attributed to the detection limit of XRD for very low concentrations and the fact that the intensity of the X-rays diffracted from $CoFe_2O_4$ planes is less than that of BTO.

Figure 2:
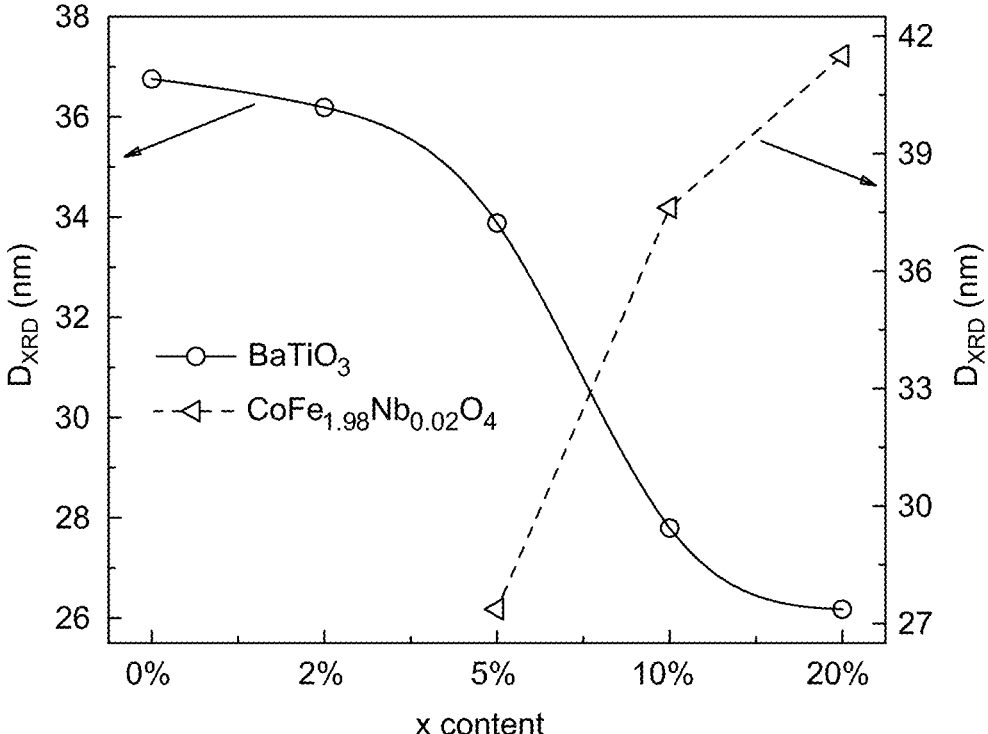
FIG. 2 shows variations of crystallite size ($D_{XRD}$) values for both BTO and $CoNb_{0.02}Fe_{1.98}O_4$ phases with respect to x content, according to certain embodiments.
Figure 3A:
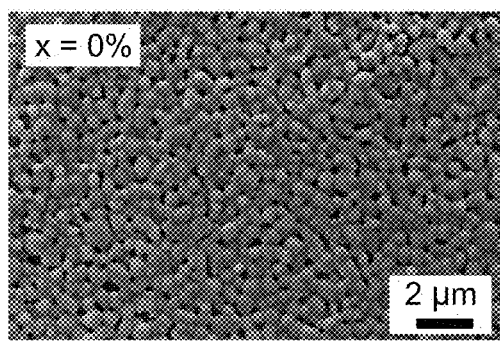
FIG. 3A shows a scanning electron microscopy (SEM) image for 100% BTO+0% $CoNb_{0.02}Fe_{1.98}O_4$ composite, according to certain embodiments.
Figure 3B:
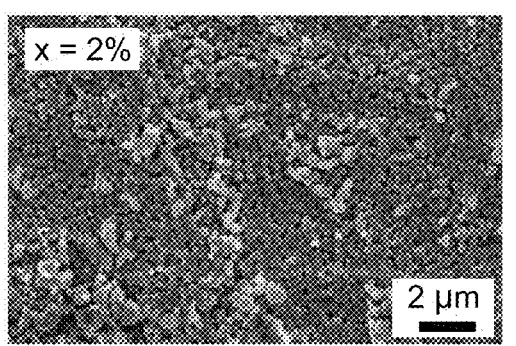
FIG. 3B shows an SEM image for 98% BTO+2% $CoNb_{0.02}Fe_{1.98}O_4$ composite, according to certain embodiments.
Figure 3C:
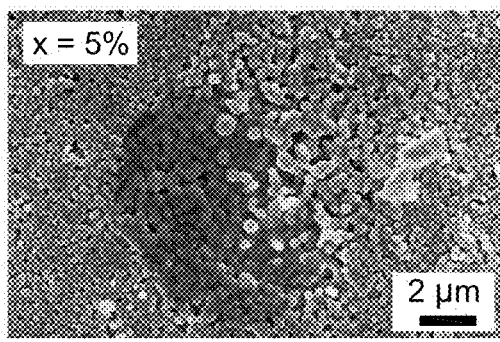
FIG. 3C shows an SEM image for 95% BTO+5% $CoNb_{0.02}Fe_{1.98}O_4$ composite, according to certain embodiments.
Figure 3D:
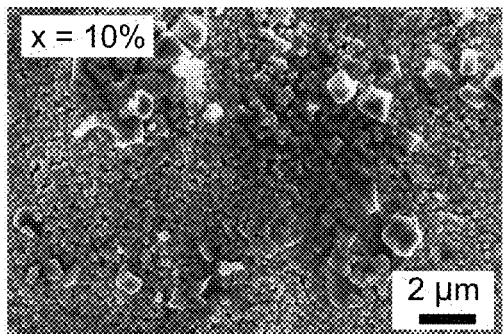
FIG. 3D shows an SEM image for 90% BTO+10% $CoNb_{0.02}Fe_{1.98}O_4$ composite, according to certain embodiments.
Figure 3E:
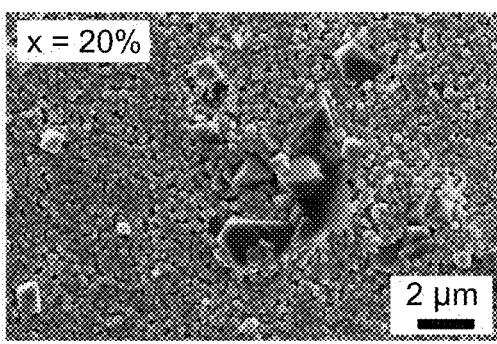
FIG. 3E shows an SEM image for 80% BTO+20% $CoNb_{0.02}Fe_{1.98}O_4$ composite, according to certain embodiments.

The crystallite size ($D_{XRD}$) of the synthesized products was determined by Scherrer's equation:

$$D_{XRD} = \frac{0.9\lambda}{\beta\cos\theta} \tag{1}$$

where $\lambda$ is the incident X-ray wavelength, $\beta$ is the full width at half maximum (FWHM) of the XRD peak, and $\theta$ is the Bragg's angle. The obtained $D_{XRD}$ values for both BTO (using 101 peak for the tetragonal phase and 110 peak for the cubic phase) and $CoNb_{0.02}Fe_{1.98}O_4$ (using 311 peak) phases existing in the different composites are plotted in FIG. 2. The crystallite sizes of pure BTO and $CoNb_{0.02}Fe_{1.98}O_4$ have been realized to be 36.8 nm and 10.6 nm, respectively. For the prepared composites, the crystallite size for the BTO phase is gradually decreasing with increasing x content. It decreased from 36.2 nm for x=2% to 27.8 nm for x=20%, whereas the crystallite size for the $CoNb_{0.02}Fe_{1.98}O_4$ phase is increasing with increasing x content. Indeed, some of the magnetic particles will tend to agglomerate because of their magnetic nature, creating practically dense and compacted granules. Under heat treatment, the crystallite size of the $CoNb_{0.02}Fe_{1.98}O_4$ phase will tend to increase with increasing the concentration of the magnetic phase, limiting the growth of the BTO phase [Rather G H, Ikram M. Magnetoelectric coupling in terbium doped particulate multiferroic composites based on $BaTiO_3$—$CoFe_2O_4$. Physica B. 2020; 599:412577, incorporated herein by reference in its entirety].

Figure 4:
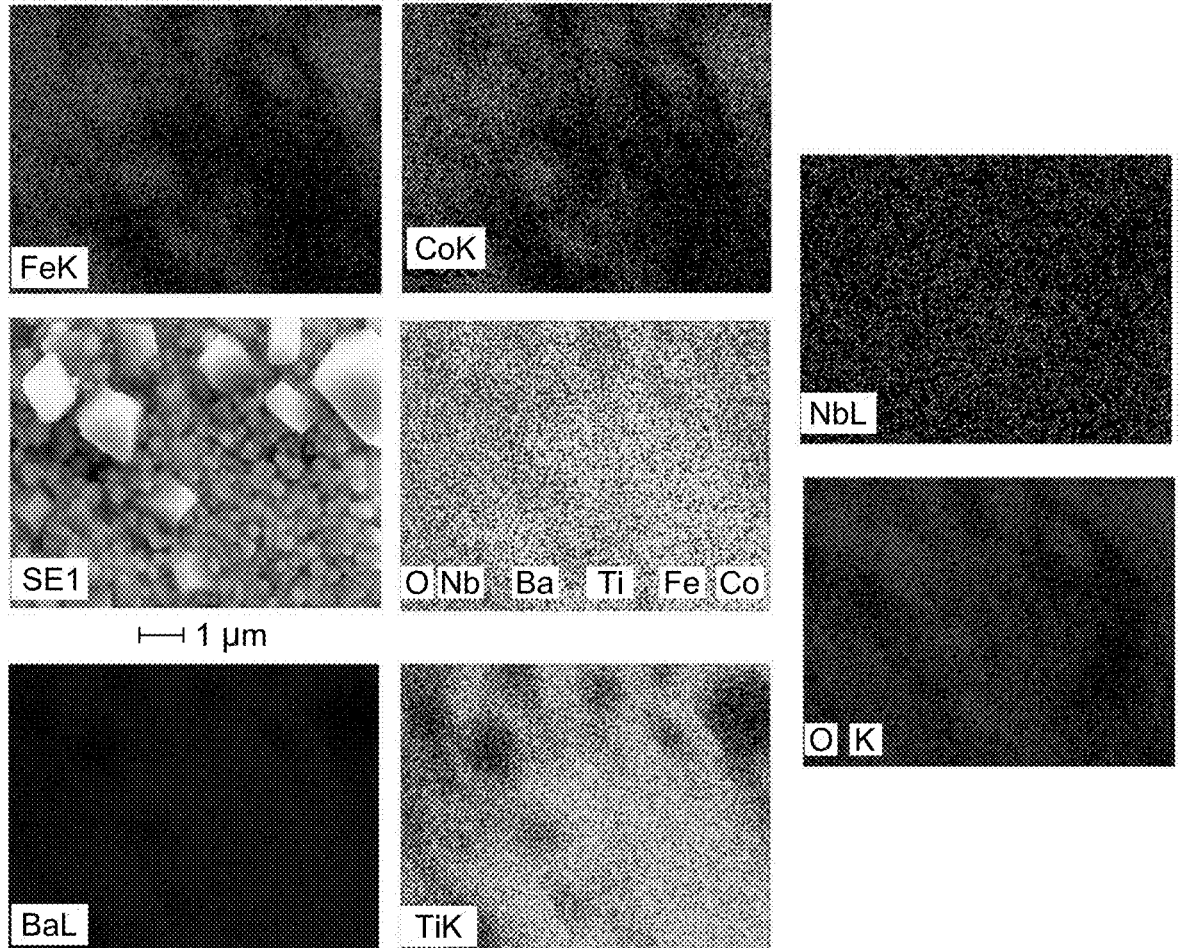
FIG. 4 shows elemental mapping images for 90% BTO+ 10% $CoNb_{0.02}Fe_{1.98}O_4$ composite, according to certain embodiments.

The surface morphology graphs for (100-x) % BTO+x % $CoFe_{1.98}Nb_{0.02}O_4$ composites, where x=0%, 2%, 5%, 10%, and 20%, are taken by means of SEM technique and presented in FIG. 3. These micrographs disclosed how the grains vary with the inclusion of the magnetic $CoFe_{1.98}Nb_{0.02}O_4$ phase. The pristine BTO sample (FIG. 3A) contained closely spherical grains with a high density of pores. However, SEM observations of BTO+x % $CoNb_{0.02}Fe_{1.98}O_4$ composites, where x=2%, 5%, 10%, and 20% (FIGS. 3B-3E), indicated the existence of dissimilar particles in terms of shape and size, which belong to $CoFe_{1.98}Nb_{0.02}O_4$ and BTO phases. The distribution of $CoFe_{1.98}Nb_{0.02}O_4$ and BTO phases was confirmed by elemental mappings performed using the EDX system coupled with SEM (FIG. 4). The elemental mappings indicated that some regions are rich with Ba and Ti elements, while some other regions are rich with Co and Fe elements. Accordingly, it has been established that the bright regions observed in FIGS. 3B-3E) largely resemble to the BTO grains, whereas the darkened regions are largely associated with the $CoFe_{1.98}Nb_{0.02}O_4$ spinel ferrite grains. Furthermore, compared to the pure BTO sample, the average BTO grains size is slightly reduced after the inclusion of magnetic spinel ferrite $CoFe_{1.98}Nb_{0.02}O_4$ phase. The magnetic $CoFe_{1.98}Nb_{0.02}O_4$ grains were found to increase as x % concentration rises, which could be mainly ascribed to their magnetic nature that leads them to agglomerate. It could be also noticed that the density of pores greatly decreased for different composites (i.e., >2%), and very dense and compacted granules are clearly observed for higher x % contents (particularly composites with x=10% and 20%).

Figure 5A:
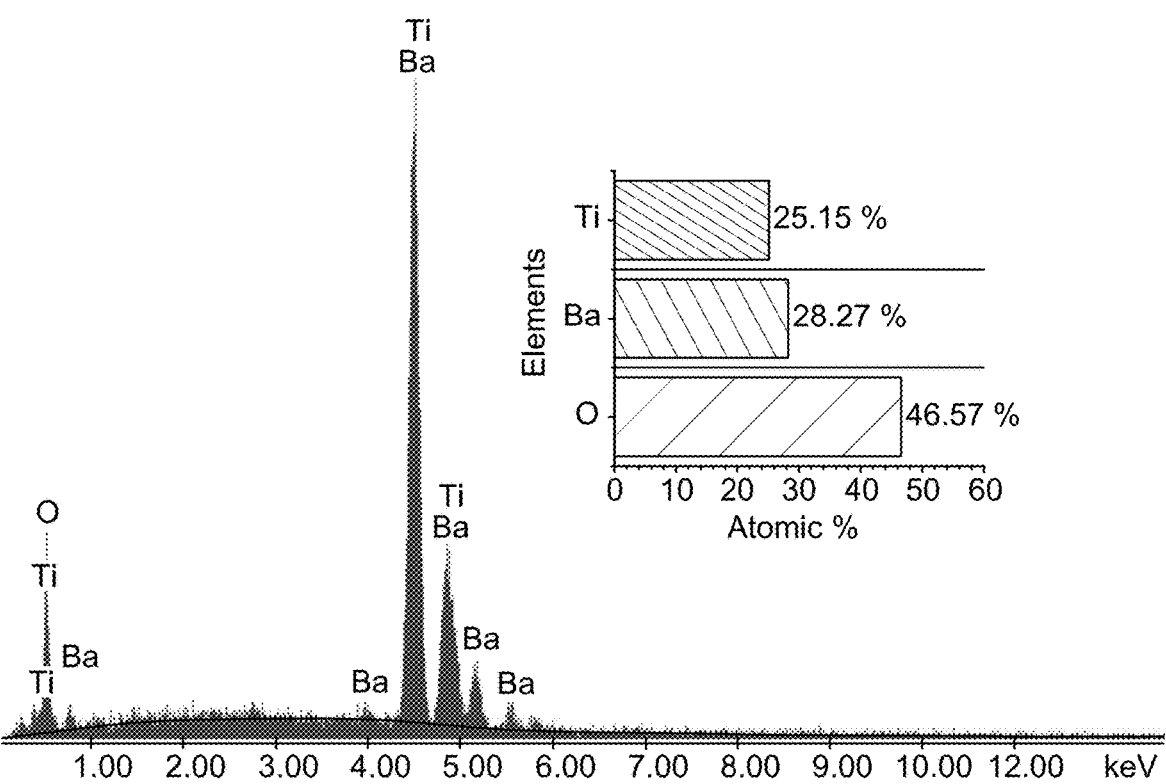
FIG. 5A shows Energy dispersive X-ray spectroscopy (EDX) spectra and corresponding atomic ratios (insets) for pure BTO sample, according to certain embodiments.
Figure 5B:
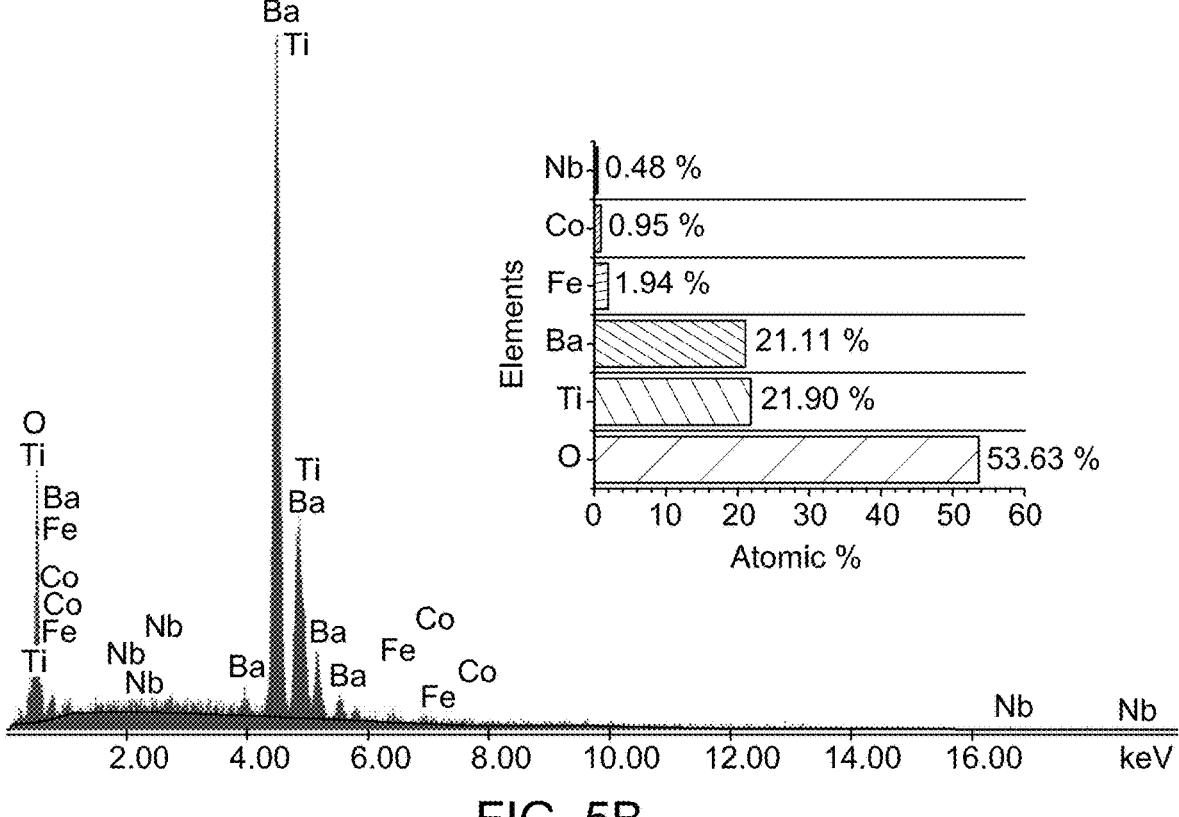
FIG. 5B shows EDX spectra and corresponding atomic ratios (insets) for 90% BTO+10% $CoNb_{0.02}Fe_{1.98}O_4$ composite, according to certain embodiments.

FIGS. 5A and 5B show elemental EDX spectra and the corresponding atomic ratios for pure BTO and composite 90% BTO+10% $CoNb_{0.02}Fe_{1.98}O_4$ sample, respectively. EDX spectrum of pure BTO (FIG. 5A) revealed that Ba, Ti, and O are present, wherein the atomic percentage ratio of Ba to Ti is about 1:1. FIG. 5B confirmed the existence of distinct elements Ti, Ba, Nb, Fe, Co, and O, constituting the BTO+$CoNb_{0.02}Fe_{1.98}O_4$ composite with no existence of any foreign elements. Within this composite, the atomic percentage ratios of Ba:Ti and Co:NbFe are almost 1:1 and 1:2, respectively. For the whole composite system, the atomic percentages of elements belonging to the magnetic phase Co—Nb—Fe constitute closely 10% of the elements belonging to the dielectric phase Ba—Ti. It is evident that the atomic ratios closely resemble the calculated cations stoichiometry used for the preparation of different samples. The studies performed by means of SEM and XRD techniques established the ability to successfully create biphasic composites using the solid-state reaction method.

Figure 6:
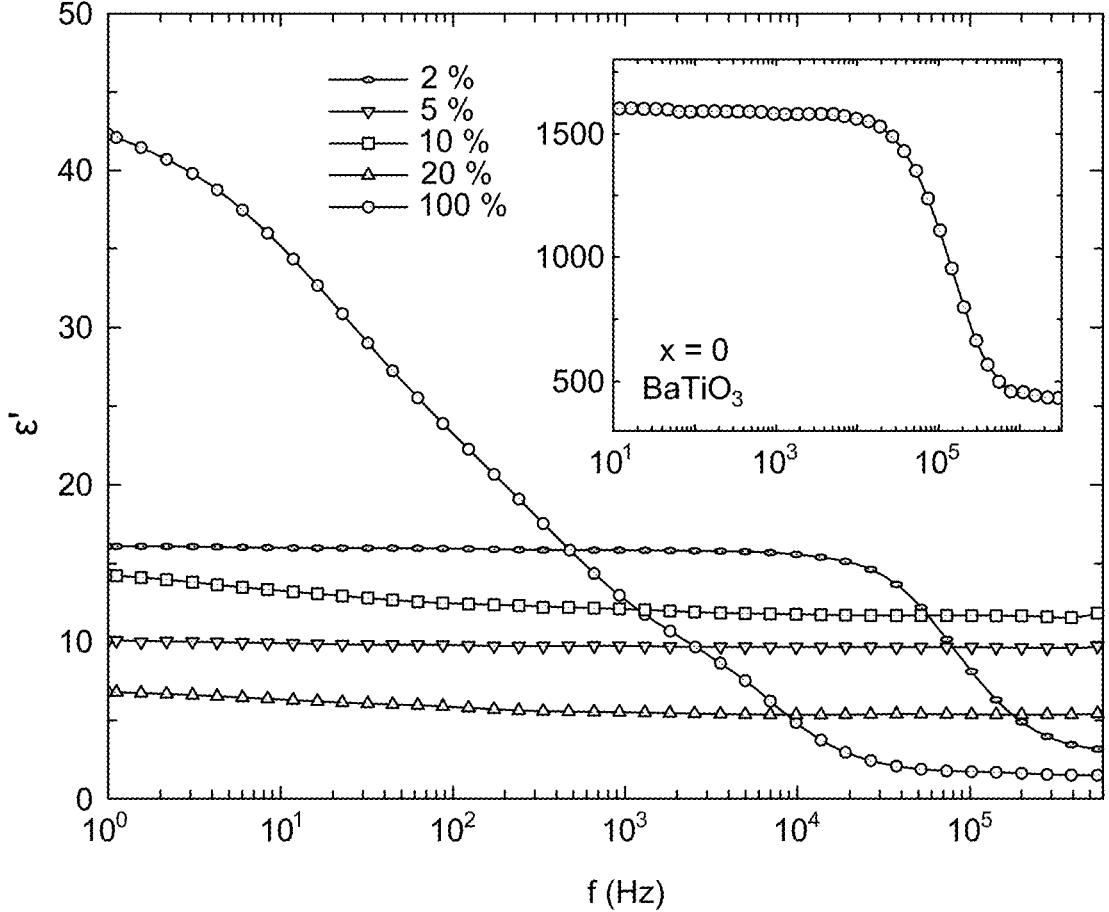
FIG. 6 shows variations in dielectric constant (ε') with frequency (ƒ) for pure BTO (inset figure x=0.0) and (100-x) % BTO+x % $CoFe_{1.98}Nb_{0.02}O_4$ composites (x=2%, 5%, 10%, 20% and 100%) measured at room temperature, according to certain embodiments.
Figure 7A:
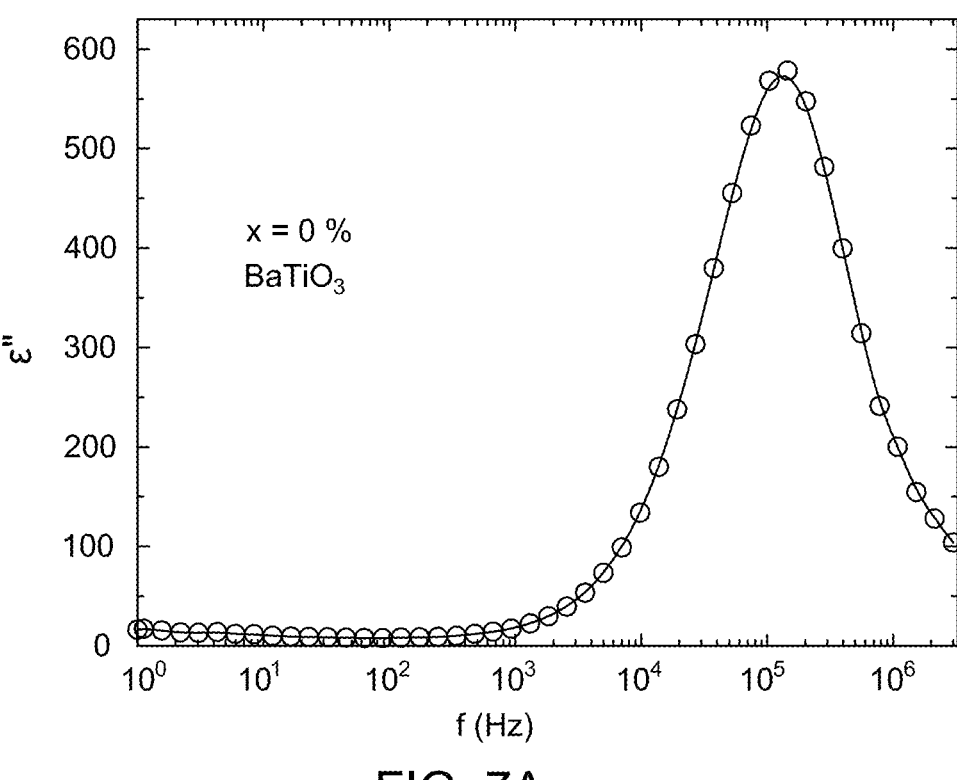
FIG. 7A shows variations in dielectric loss (ε") with ƒ of (100-x) % BTO+x % $CoFe_{1.98}Nb_{0.02}O_4$ composites (x=0%), according to certain embodiments.
Figure 7B:
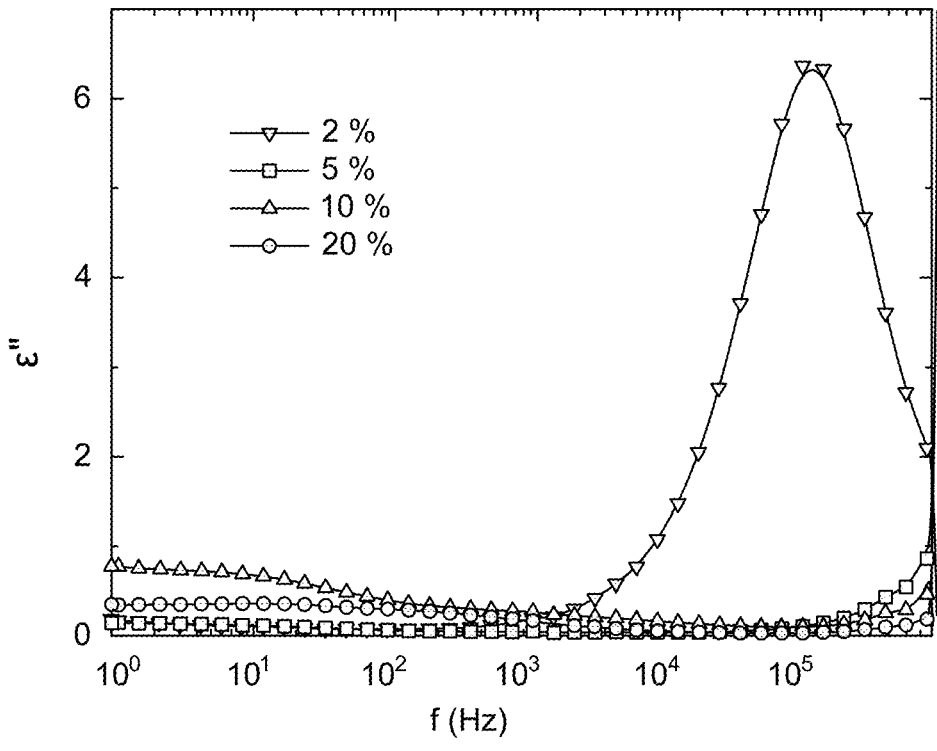
FIG. 7B shows variations in ε" with ƒ of (100-x) % BTO+x % $CoFe_{1.98}Nb_{0.02}O_4$ composites (x=2%, 5%, 10%, and 20%), according to certain embodiments.
Figure 7C:
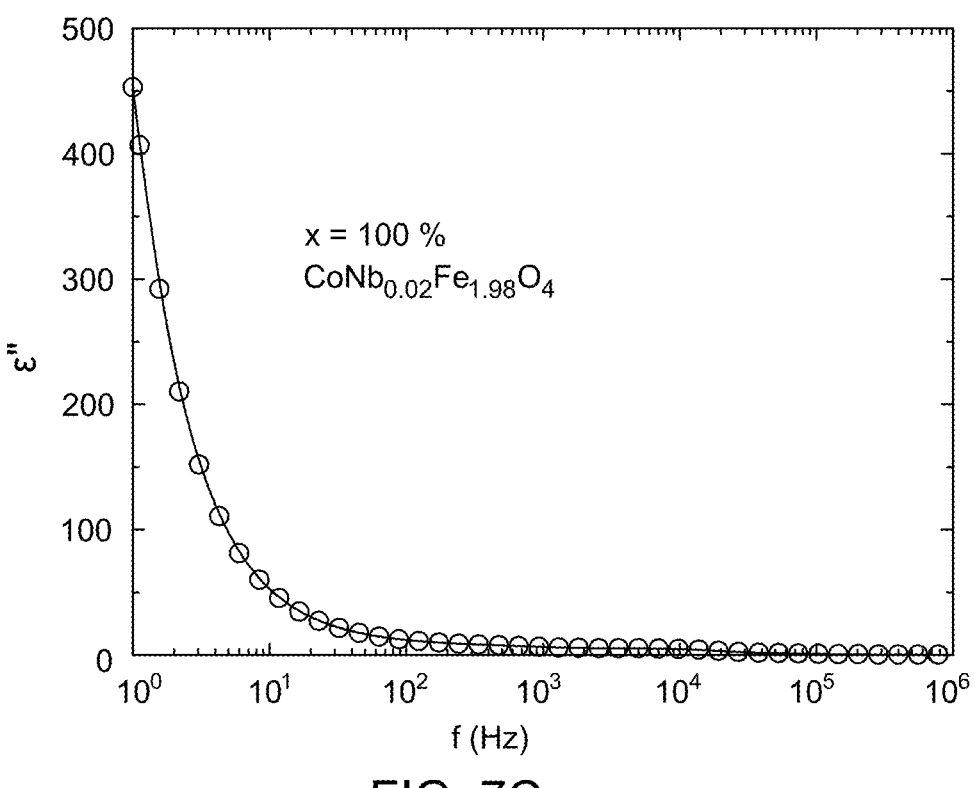
FIG. 7C shows variations in ε" with ƒ of (100-x) % BTO+x % $CoFe_{1.98}Nb_{0.02}O_4$ composites (x=100%), according to certain embodiments.
Figure 7D:
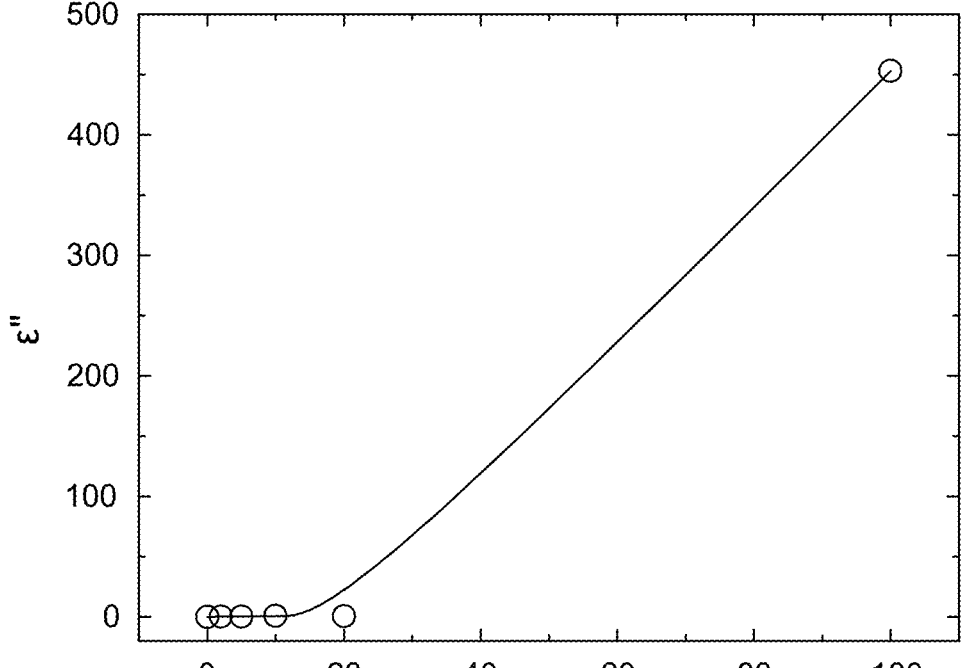
FIG. 7D shows variations in ε" for different x contents (x=0%, 2%, 5%, 10%, 20%, and 100%) measured at ƒ=1 Hz, according to certain embodiments.

Dielectric constant ($\varepsilon'$) versus applied frequency ($f$) for (100-x) % BTO+x % $CoFe_{1.98}Nb_{0.02}O_4$ composite samples are displayed in FIG. 6. The inset of FIG. 6 shows the variation in $\varepsilon'$ with frequency, which revealed a typical polarization behavior of ferroelectric BTO (x=0%). The dielectric constant almost remains unchanged up to $f=\sim10^4$ Hz and decreased exponentially beyond this frequency. A decrease in the dielectric constant at $f>10^4$ Hz for ferroelectric BTO is correlated to the defects' motion and domain walls' vibrations. Low-frequency dielectric polarization is observed for the $CoNb_{0.02}Fe_{1.98}O_4$ sample, which is a typical behavior of ferrite materials. Space charge polarization is a major driving force for observed dielectric polarization in (100-x) % BTO+x % $CoFe_{1.98}Nb_{0.02}O_4$ composite samples. The observed dielectric behavior can be understood based on the Maxwell-Wagner layer model according to Koop's phenomenological theory. Electronic polarization could maintain with AC electric fields until frequency surpasses its relaxation frequency, whereas the individual polarization ends alternating with the frequency of the electric field, leading to dispersion in $\varepsilon'$. Not all dipoles display the same relaxation frequency resulting in a gradual occurrence of dispersion rather than a sharp decrease.

Furthermore, the polarization in ferrite-ferroelectric composites is analogous to the conduction mechanism [Rabinkin I T, Novikova Z I. Ferrites, Izv Acad. Nauk USSR Minsk. 1960; 146, incorporated herein by reference in its entirety], and can be obtained by the percentage of electron exchange interaction amongst:

$$Fe^{2+}\leftrightarrow Fe^{3+}+e^-$$

$$Co^{2+}\leftrightarrow Co^{3+}+e^-$$

From FIG. 6, it is noticed that the BTO sample shows the highest $\varepsilon'$ values among all investigated samples since the ferroelectric phase is known to possess a higher dielectric constant compared to the ferromagnetic phase.

Figure 8:
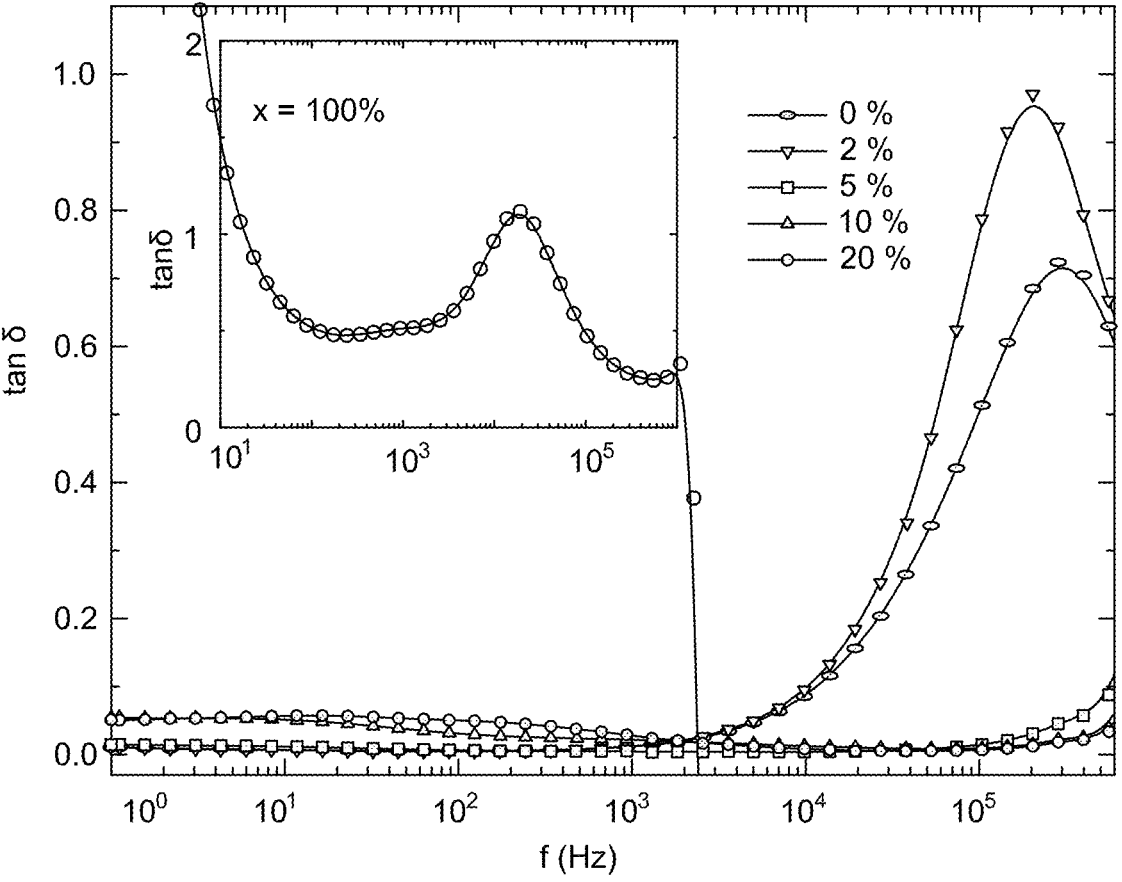
FIG. 8 shows variations in dielectric loss tangent (tan δ) with ƒ for different (100-x) % BTO+x % $CoFe_{1.98}Nb_{0.02}O_4$ composites (x=0%, 2%, 5%, 10%, 20%, and 100%) measured at room temperature, according to certain embodiments.

FIGS. 7 and 8 illustrate the variations in dielectric loss ($\varepsilon''$) and dielectric loss tangent (tan $\delta$) with applied frequency for all investigated samples of (100-x) % BTO+x % $CoFe_{1.98}Nb_{0.02}O_4$. It is observed that $\varepsilon''$ and tan $\delta$ is small for pure BTO sample and BTO+$CoNb_{0.02}Fe_{1.98}O_4$ composites and maximum for pure $CoNb_{0.02}Fe_{1.98}O_4$. This behavior suggests that $\varepsilon''$ could increase with the rise in the ferromagnetic $CoNb_{0.02}Fe_{1.98}O_4$ phase. This expectation is correlated to the difference in resistivity of the ferroelectric (BTO) and ferromagnetic ($CoNb_{0.02}Fe_{1.98}O_4$) phase. The relaxation-related peak in $\varepsilon''$ and tan $\delta$ plots were observed for some samples and can be understood by Rezlescu model [Rezlescu N, Rezlescu E. Dielectric properties of copper containing ferrites. physica status solidi (a). 1974; 23(2): 575, incorporated herein by reference in its entirety]. The condition for the peak in the $\varepsilon''$ and tan $\delta$ of these samples is related to:

$$\omega\tau = 1 \qquad (2)$$

where $\tau$ is the relaxation time and $\omega=2\pi f_{max}$, which is related to the jumping probability:

$$\tau = \frac{1}{2p} \tag{3}$$

$$\text{or } f_{max} \propto p \tag{4}$$

Thus, a peak can be obtained as a result of the frequency of charge hopping among cations coinciding with the frequency of the electric field.

Low values of dielectric loss tangent less than 1 are observed for different composites (x=2, 5, 10, and 20%). More specifically, composite materials with x≥5% displayed very low values of dielectric loss tangent (below 0.1), along with good stability over the range of frequency. Generally, the increase in tan δ results from a delay in polarization with an alternating field, which could be caused by the hopping of electrons from $Fe^{2+}$ to $Fe^{3+}$, the loss in conduction because of poor densification and the presence of defects and impurities. Losses because of conduction appear at low frequencies. Hence, the observed low dielectric losses in x≥5% compositions could be ascribed to the homogeneous structure, the good stoichiometry, and the contribution of the ferrite phase. This is evidenced by the above-reported SEM observations. The obtained results indicated that the present composite products might be suitable for high-frequency device applications like antennas, filters, dielectric resonators, and others.

Figures 9A, 9B:
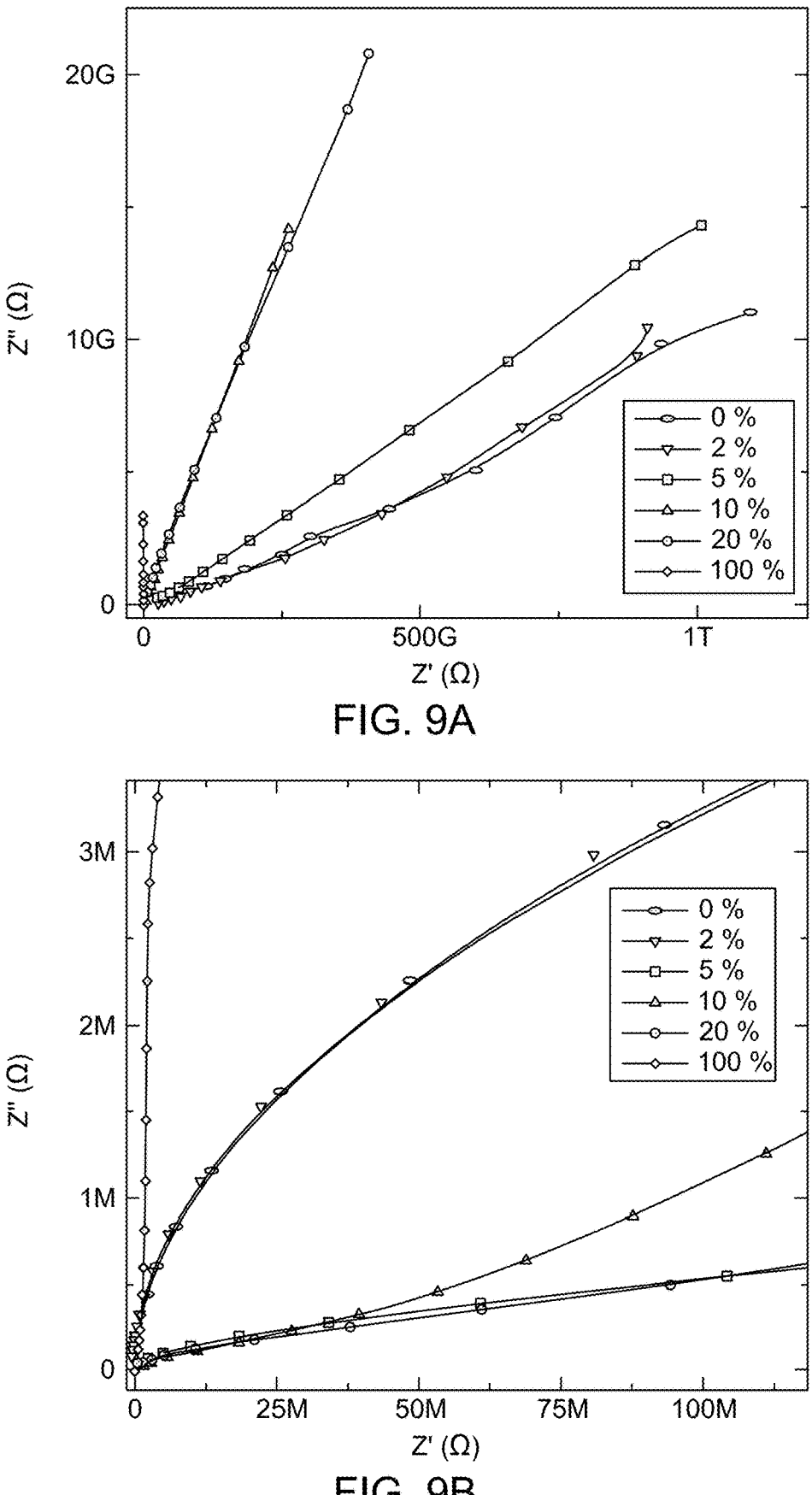
FIG. 9A is a Cole-Cole plot showing the range of impedance spectra for curves of an imaginary part of impedance (Z") versus real part of impedance (Z') for (100-x) % BTO+x % $CoFe_{1.98}Nb_{0.02}O_4$ composites (x=0%, 2%, 5%, 10%, 20%, and 100%), according to certain embodiments.
FIG. 9B is a Cole-Cole plot showing an expanded view of impedance spectra at a lower frequency for curves of Z" versus Z' for (100-x) % BTO+x % $CoFe_{1.98}Nb_{0.02}O_4$ composites (x=0%, 2%, 5%, 10%, 20%, and 100%), according to certain embodiments.
Figure 10A:
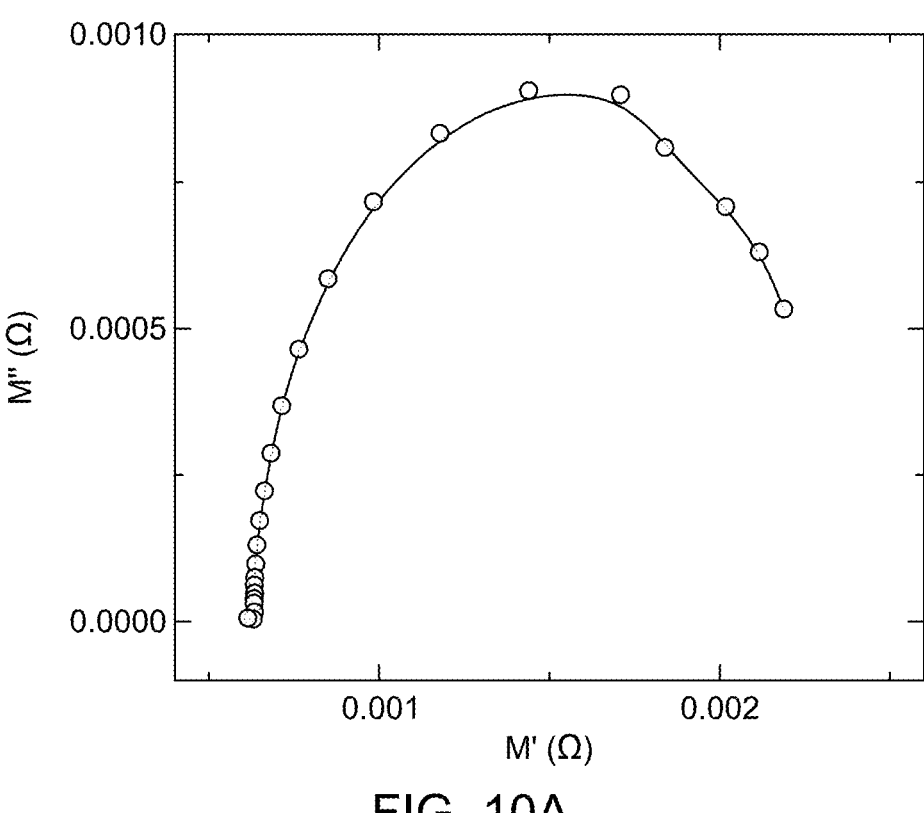
FIG. 10A shows the electrical modulus plane plots of the imaginary part of modulus (M") versus real part of modulus (M') of (100-x) % $BaTiO_3$+x % $CoFe_{1.98}Nb_{0.02}O_4$ composites (x=0%) measured at room temperature, according to certain embodiments.
Figure 10B:
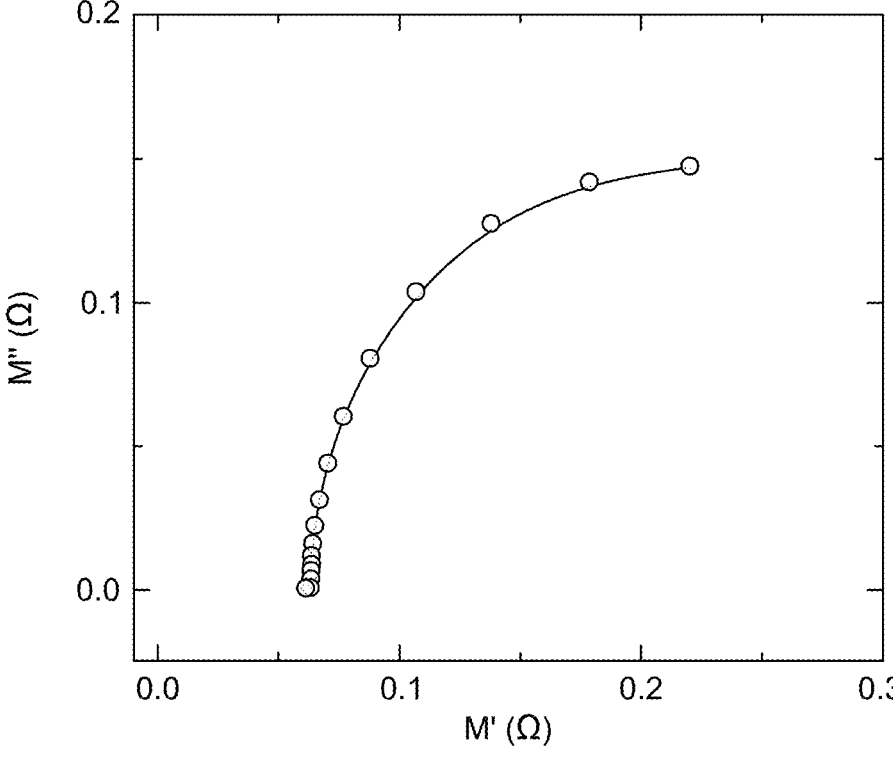
FIG. 10B shows the electrical modulus plane plots of M" versus M' of (100-x) % $BaTiO_3$+x % $CoFe_{1.98}Nb_{0.02}O_4$ composites (x=2%), measured at room temperature, according to certain embodiments.
Figures 10C, 10D:
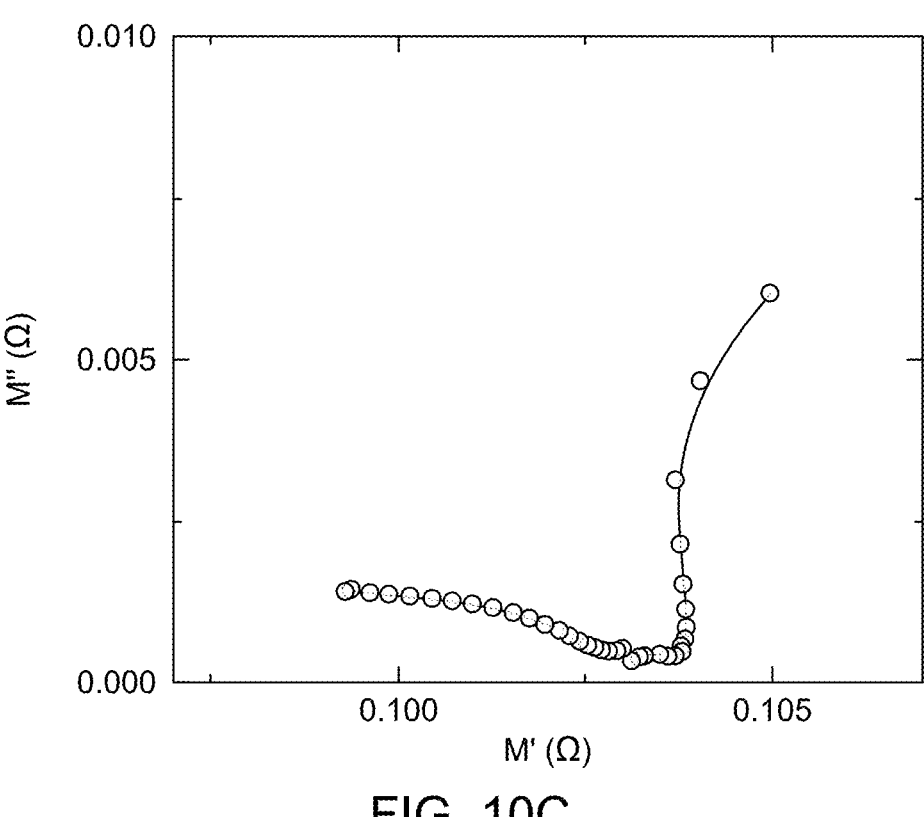
FIG. 10C shows the electrical modulus plane plots of M" versus M' of (100-x) % $BaTiO_3$+x % $CoFe_{1.98}Nb_{0.02}O_4$ composites (x=5%), measured at room temperature, according to certain embodiments.
FIG. 10D shows the electrical modulus plane plots of M" versus M' of (100-x) % $BaTiO_3$+x % $CoFe_{1.98}Nb_{0.02}O_4$ composites (x=10%), measured at room temperature, according to certain embodiments.
Figure 10E:
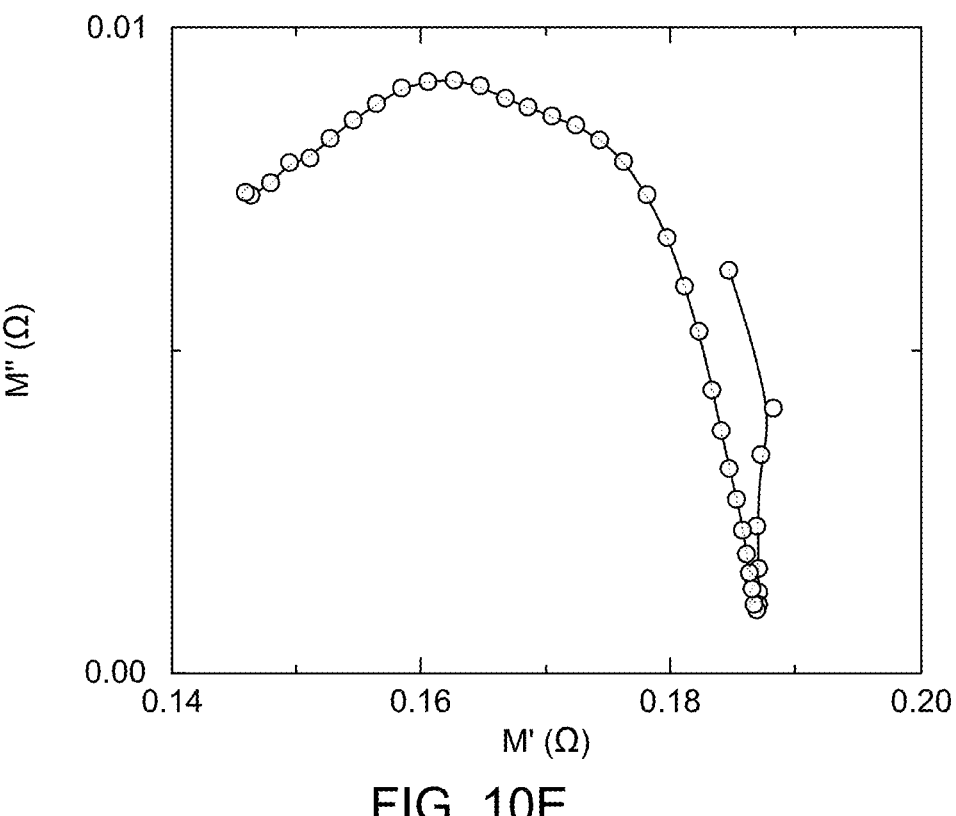
FIG. 10E shows the electrical modulus plane plots of M" versus M' of (100-x) % $BaTiO_3$+x % $CoFe_{1.98}Nb_{0.02}O_4$ composites (x=20%), measured at room temperature, according to certain embodiments.
Figure 10F:
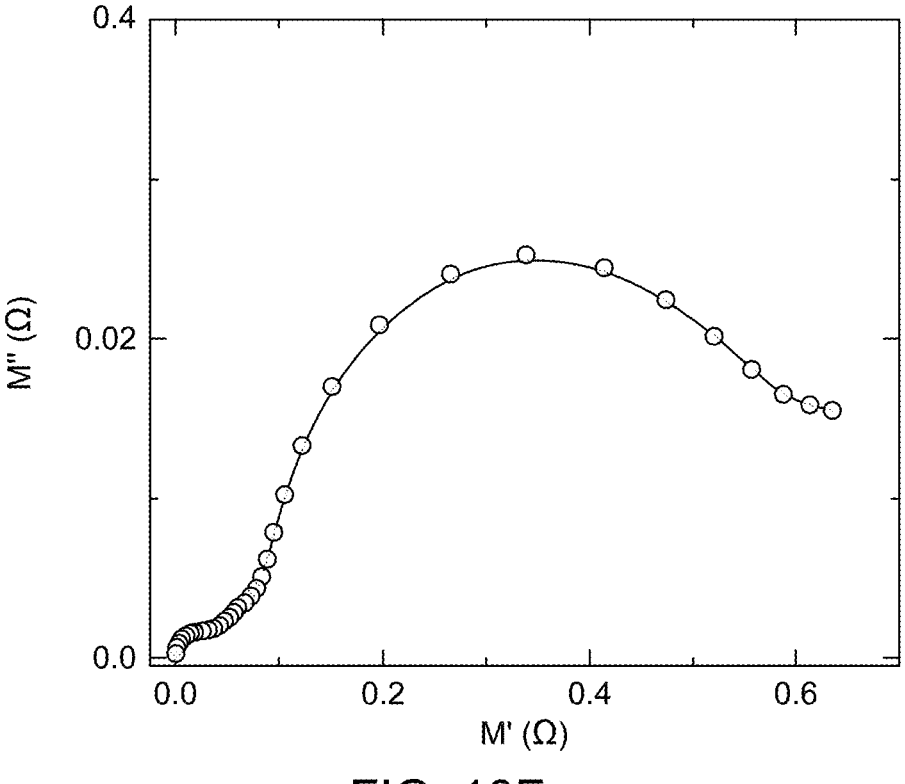
FIG. 10F shows the electrical modulus plane plots of M" versus M' of (100-x) % $BaTiO_3$+x % $CoFe_{1.98}Nb_{0.02}O_4$ composites (x=100%), measured at room temperature, according to certain embodiments.

The imaginary part of impedance (Z") was plotted versus the real part of impedance (Z') in FIG. 9, known as Nyquist or Cole-Cole plot. It is known that two semi-circles can be observed in the Cole-Cole plots. The first semi-circle, as a result of resistance originating from the grain boundary $(R_{gb})$ can appear at a lower frequency; and the second semicircle, due to resistance of grain $(R_g)$ can appear at a higher frequency. A close observation of FIG. 9A revealed that no semicircle was observed at a lower frequency, and probably no contribution of resistance is offered by the grain boundaries towards dielectric properties. An expanded view of Cole-Cole plot, shown in FIG. 9B, reveals a depressed type of semi-circle observed at a higher frequency. Thus, grain contributed higher resistance in the dielectric behavior of the prepared samples. The electrical modulus plane plots of different samples are presented in FIG. 10, where the imaginary M" is plotted versus the real part M' of modulus. The capacitance value can be obtained using these plots with a contribution from the grain boundary and grain. Only one semicircle is observed for the pure BTO (x=0%) and 98% BTO+2% $CoNb_{0.02}Fe_{1.98}O_4$ samples; for x>2%, a second semi-circle also starts to form. Two semicircles in the modulus plane plots suggest two relaxation processes occur. It can be concluded from FIGS. 9 and 10 that resistance of the materials increased with the increase in the ferromagnetic $CoNb_{0.02}Fe_{1.98}O_4$ phase, and thus resulted in lower dielectric properties compared to pure BTO.

To this end, composite materials of (100-x) % BTO+x % $CoFe_{1.98}Nb_{0.02}O_4$ composites (x=0, 2, 5, 10, 20, and 100%) were developed using the solid-state reaction. XRD, SEM, and EDX analyses showed that the perovskite BTO and spinel ferrite phases distinctly exist in the composites. No traces of any impurity are noticed. A transformation from the tetragonal BTO phase in pristine x=0% sample to the cubic BTO phase occurred when the $CoNb_{0.02}Fe_{1.98}O_4$ was added to the BTO phase. The addition of the $CoNb_{0.02}Fe_{1.98}O_4$ phase into the BTO phase resulted in an increase in the lattice parameters and cell volume of the prepared composites. Compared to the x=0% sample, the average BTO grains size is slightly reduced after the inclusion of magnetic $CoFe_{1.98}Nb_{0.02}O_4$ spinel ferrite phase, while magnetic $CoFe_{1.98}Nb_{0.02}O_4$ grains are enlarged as x % concentration rises. The dielectric properties are also investigated at room temperature in a frequency range of 1 to $10^6$ Hz. The dielectric loss tangent indicated low values lesser than 1 for different (100-x) % BTO+x % $CoFe_{1.98}Nb_{0.02}O_4$ composites with x=2, 5, 10, and 20%. Among these composites, the sample prepared with x content higher than 5% displayed very low dielectric loss tangent (below 0.1) along with good stability over the frequency range of 1 to $10^6$ Hz. This is mainly ascribed to the homogeneous structure, the stoichiometry, and the contribution of the ferrite phase. The current results indicated that the present composite materials might be suitable for high-frequency device applications.

Numerous modifications and variations of the present disclosure are possible in light of the above teachings. It is therefore to be understood that within the scope of the appended claims, the disclosure may be practiced otherwise than as specifically described herein.

What is claimed is:

1. A ceramic composite material, comprising:
BaTiO₃; and
$CoFe_{1.98}Nb_{0.02}O_4$,
wherein the BaTiO₃ is present in an amount of 1 to 99 percent by weight based on a total weight of the BaTiO₃ and the $CoFe_{1.98}Nb_{0.02}O_4$,
wherein the $CoFe_{1.98}Nb_{0.02}O_4$ is present in an amount of 1 to 99 percent by weight based on the total weight of the BaTiO₃ and the $CoFe_{1.98}Nb_{0.02}O_4$.

2. The material of claim 1, wherein the BaTiO₃ is in the form of particles having a crystallite size of 20 to 45 nm.

3. The material of claim 2, wherein a BaTiO₃ phase is present as a single phase with a tetragonal structure.

4. The material of claim 1, wherein the $CoFe_{1.98}Nb_{0.02}O_4$ is present in the form of particles having a crystallite size of 5 to 50 nm.

5. The material of claim 4, wherein a $CoFe_{1.98}Nb_{0.02}O_4$ phase is present as a single phase.

6. The material of claim 1, wherein the BaTiO₃ and the $CoFe_{1.98}Nb_{0.02}O_4$ are present as separate phases.

7. The material of claim 1, wherein the BaTiO₃ is a cubic phase.

8. The material of claim 1, having a porous, irregular granular morphology with an average particle size of 0.1 to 10 μm.

9. The material of claim 2, wherein a BaTiO₃ phase comprises spherical particles with an average particle diameter of 0.1 to 2 μm.

10. The material of claim 4, wherein a $CoFe_{1.98}Nb_{0.02}O_4$ phase comprises rhombic particles with an average particle diameter of 0.5 to 5 μm.

11. The material of claim 1, wherein the ceramic composite material has one or more regions of a BaTiO₃ phase and one or more regions of a $CoFe_{1.98}Nb_{0.02}O_4$ phase.

12. The material of claim 1, wherein the ceramic composite material is biphasic comprising a dielectric BaTiO₃ phase and a magnetic $CoFe_{1.98}Nb_{0.02}O_4$ phase.

13. The material of claim 1, wherein barium is present in an amount of 10 to 30 mol percent, titanium is present in an amount of 10 to 30 mol percent, oxygen is present in an amount of 40 to 60 mol percent, cobalt is present in an amount of 0.1 to 3 mol percent, iron is present in an amount of 0.1 to 4 mol percent, and niobium is present in an amount of 0.1 to 2 mol percent based on a total number of mols of the barium, titanium, oxygen, cobalt, iron, and niobium.

14. The material of claim 1, having a dielectric constant of 1 to 20 at a frequency of 1 to $10^6$ Hz.

15. The material of claim 1, having a dielectric loss of 0.1 to 7 at a frequency of 1 to $10^6$ Hz according to ASTM D150.

16. The material of claim 1, having a dielectric loss tangent of 0.01 to 1 at a frequency of 1 to $10^6$ Hz.

17. The material of claim 1, wherein the $BaTiO_3$ is made by a sol-gel process.

18. The material of claim 1, wherein the $CoFe_{1.98}Nb_{0.02}O_4$ is made by a hydrothermal process.

19. The material of claim 1, wherein the ceramic composite material is made by a solid-state reaction process.

20. A high frequency device, comprising:
the material of claim 1.

\* \* \* \* \*